US012691931B2

(12) United States Patent
Endo et al.

(10) Patent No.: US 12,691,931 B2
(45) Date of Patent: Jul. 28, 2026

(54) CONTROL DEVICE, ELECTRIC POWER STEERING DEVICE, AND DRIVE DEVICE

(71) Applicant: NIDEC CORPORATION, Kyoto (JP)

(72) Inventors: Shuji Endo, Kyoto (JP); Sohei Miyake, Kyoto (JP); Daisuke Notsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 13 days.

(21) Appl. No.: 18/754,813

(22) Filed: Jun. 26, 2024

(65) Prior Publication Data

US 2025/0002075 A1     Jan. 2, 2025

Related U.S. Application Data

(60) Provisional application No. 63/523,925, filed on Jun. 29, 2023.

(30) Foreign Application Priority Data

Dec. 28, 2023     (JP) ................................. 2023-223109

(51) Int. Cl.
B62D 5/04          (2006.01)
(52) U.S. Cl.
CPC ......... B62D 5/0463 (2013.01); B62D 5/0409 (2013.01)
(58) Field of Classification Search
CPC ............................ B62D 5/0463; B62D 5/0409
USPC ......................................................... 701/41
See application file for complete search history.

(56) References Cited

U.S. PATENT DOCUMENTS

| | | | | |
|---|---|---|---|---|
| 11,435,761 | B1* | 9/2022 | Wiegman | ............. G05D 1/0077 |
| 2006/0200289 | A1* | 9/2006 | Chino | ................... B62D 6/008 |
| | | | | 701/41 |
| 2010/0211262 | A1* | 8/2010 | Kushiro | ................ B62D 6/008 |
| | | | | 701/41 |
| 2017/0253266 | A1* | 9/2017 | Minamiguchi | ........ B62D 6/008 |
| 2020/0114949 | A1* | 4/2020 | Eickholt | ................ H02P 21/14 |
| 2022/0315103 | A1* | 10/2022 | Mori | ................... B62D 5/0463 |
| 2023/0026554 | A1* | 1/2023 | Kodera | ................. B62D 6/008 |

* cited by examiner

*Primary Examiner* — Logan M Kraft
*Assistant Examiner* — John D Bailey
(74) *Attorney, Agent, or Firm* — Keating & Bennett, LLP

(57)          ABSTRACT

A control device includes a model following controller in which a transfer function of a control target is restricted to a transfer function of a nominal model in a frequency band in which a complementary sensitivity gain, which is a gain in a gain characteristic of a complementary sensitivity function with respect to a modeling error between the control target and the nominal model, is approximately one. A steady gain of the complementary sensitivity function is about 0.1 or more. A lower limit value of a frequency band in which the complementary sensitivity gain is about one is higher than a first resonance frequency that is a resonance frequency of a yaw rate of a vehicle. A second resonance frequency is higher than the first resonance frequency and lower than a lower limit value of a frequency band in which the complementary sensitivity gain is about one.

10 Claims, 9 Drawing Sheets

546          K$_{SAT}$

CONTROL DEVICE, ELECTRIC POWER STEERING DEVICE, AND DRIVE DEVICE

CROSS-REFERENCE TO RELATED APPLICATIONS

The present application is a Non-Provisional of U.S. Patent Application No. 63/523,925, filed on Jun. 29, 2023, and claims priority under 35 U.S.C. § 119 to Japanese Patent Application No. 2023-223109, filed on Dec. 28, 2023, the entire contents of both applications are hereby incorporated herein by reference.

1. FIELD OF THE INVENTION

The present disclosure relates to control devices, electric power steering devices, and drive devices.

2. BACKGROUND

An electric power steering system mounted on a vehicle is known.

The electric power steering system as described above is configured as a two-inertia system in which a steering wheel and a turning mechanism are coupled with a torsion bar which is a spring element interposed between them. There has been a problem that it is difficult to control a control target including such a two-inertia system as compared with that including a one-inertia system.

SUMMARY

One example embodiment of a control device of the present disclosure is a control device to control, as a control target, a portion in a steering mechanism that includes an input shaft to which a steering wheel steered by a steering operator is coupled, an output shaft coupled to the input shaft via a torsion bar, and a motor coupled to the output shaft and is mounted on a vehicle, the portion including at least the motor. The control device includes a model following controller configured or programmed to generate a correction torque to correct an input torque input to the control target based on output of the control target and a nominal model based on a configuration of the control target. The model following controller is configured or programmed such that a transfer function of the control target is restricted to a transfer function of the nominal model in a frequency band in which a complementary sensitivity gain, which is a gain in a gain characteristic of a complementary sensitivity function with respect to a modeling error between the control target and the nominal model, is approximately one. A steady gain of the complementary sensitivity function is about 0.1 or more. A lower limit value of a frequency band in which the complementary sensitivity gain is about one is higher than a first resonance frequency that is a resonance frequency of a yaw rate of the vehicle. A second resonance frequency that is a resonance frequency of the steering mechanism is higher than the first resonance frequency and lower than a lower limit value of a frequency band in which the complementary sensitivity gain is about one. The complementary sensitivity gain at the second resonance frequency is higher than the complementary sensitivity gain at the first resonance frequency, and is about 0.5 or more and less than about 1.

One example embodiment of a control device of the present disclosure is a control device to control a control target including a motor in a drive device to rotate a drive shaft to which a tire of a vehicle is coupled. The control device includes a model following controller configured or programmed to generate a correction torque to correct an input torque input to the control target based on output of the control target and a nominal model based on a configuration of the control target. The model following controller is configured or programmed such that a transfer function of the control target is restricted to a transfer function of the nominal model in a frequency band in which a complementary sensitivity gain, which is a gain in a gain characteristic of a complementary sensitivity function with respect to a modeling error between the control target and the nominal model, is approximately one. A steady gain of the complementary sensitivity function is about 0.1 or more. A lower limit value of a frequency band in which the complementary sensitivity gain is about one is higher than a first resonance frequency that is a resonance frequency of the drive device. A second resonance frequency that is a resonance frequency of a drive mechanism including the tire, the drive shaft, and the drive device is higher than the first resonance frequency and lower than a lower limit value of a frequency band in which the complementary sensitivity gain is about one. The complementary sensitivity gain at the second resonance frequency is higher than the complementary sensitivity gain at the first resonance frequency, and is about 0.5 or more and less than about 1.

An example embodiment of an electric power steering device of the present disclosure includes the control device and the steering mechanism.

An example embodiment of a drive device of the present disclosure includes the control device, the motor, and a gear mechanism connected to the motor.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a diagram schematically illustrating an electric power steering device according to an example embodiment of the present disclosure.

FIG. 10 is a diagram illustrating a simplified model of the electric power steering device according to an example embodiment of the present disclosure.

DETAILED DESCRIPTION

Figure 1:
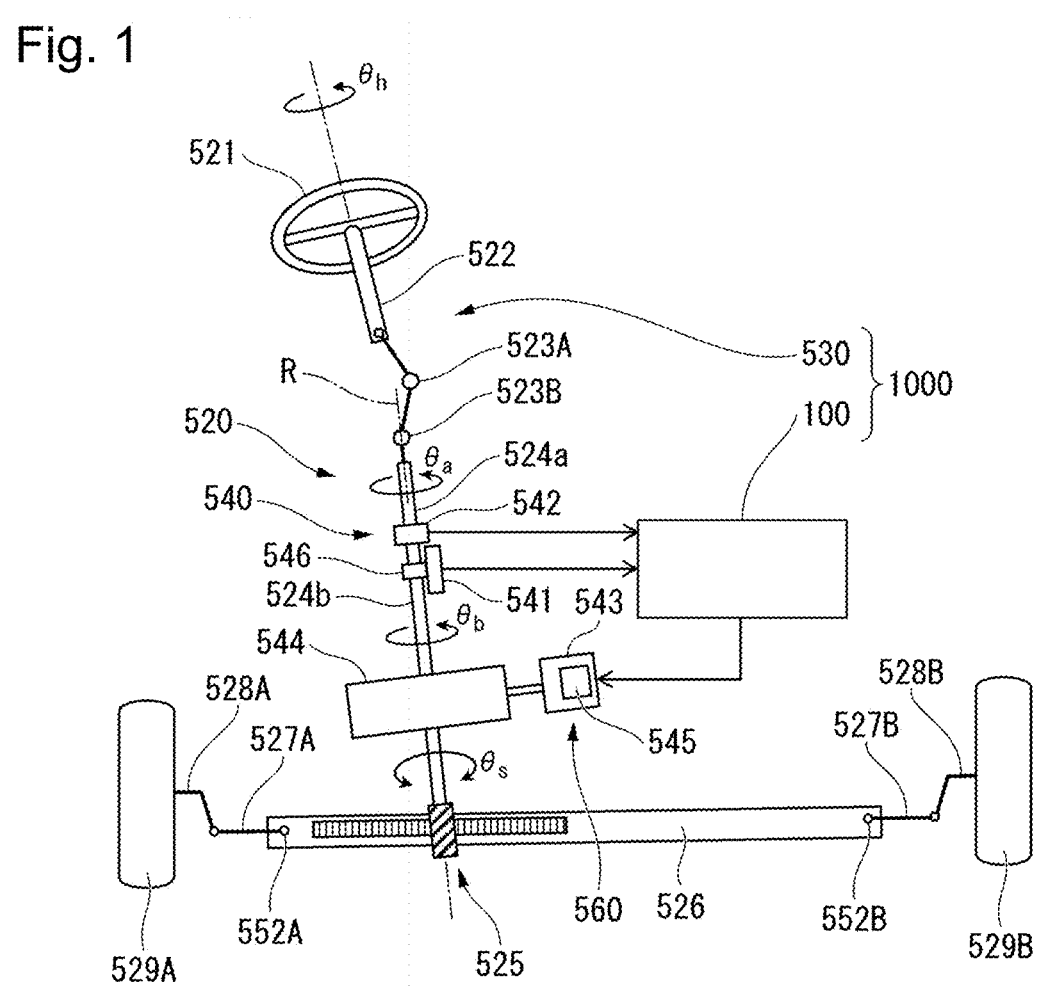
Figure 2:
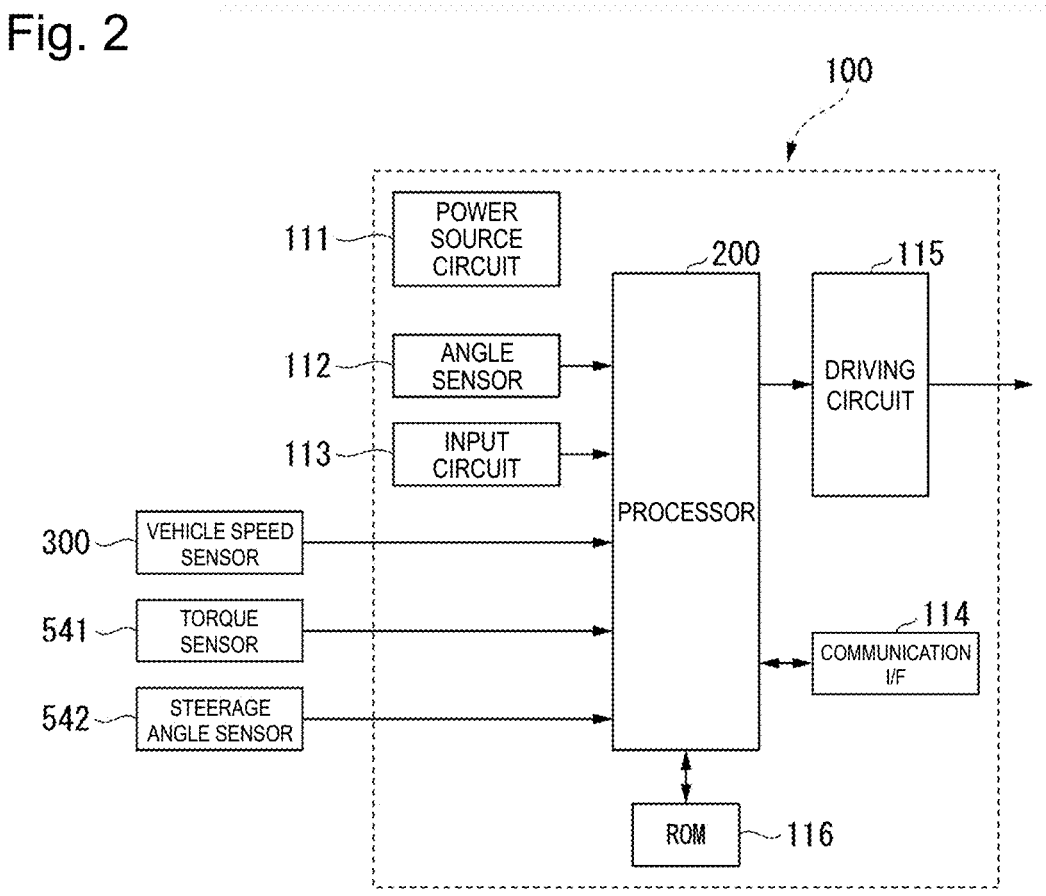
FIG. 2 is a block diagram illustrating a configuration of a control device according to an example embodiment of the present disclosure.

An electric power steering device 1000 of the present example embodiment illustrated in FIG. 1 is mounted on a vehicle. As illustrated in FIG. 1, the electric power steering device 1000 includes a steering mechanism 530 and a control device 100. The steering mechanism 530 includes a steering mechanism unit 520 and an auxiliary mechanism unit 540. The electric power steering device 1000 controls the auxiliary mechanism unit 540 by the control device 100 to generate an auxiliary torque that assists a steering torque Th generated in the steering mechanism unit 520 when a driver who drives a vehicle steers a steering wheel 521. The auxiliary torque reduces the burden of driver's operation when the driver operates the steering wheel 521. The driver of a vehicle is a steering operator who steers the steering wheel 521 of the vehicle.

The steering mechanism unit 520 includes the steering wheel 521, a steering shaft 522, universal joints 523A and 523B, an input shaft 524a, an output shaft 524b, a rack and pinion mechanism 525, a rack shaft 526, left and right ball joints 552A and 552B, tie rods 527A and 527B, knuckles 528A and 528B, and left and right tires 529A and 529B. That is, the steering mechanism 530 includes the steering wheel 521, the steering shaft 522, the universal joints 523A and 523B, the input shaft 524a, the output shaft 524b, the rack and pinion mechanism 525, the rack shaft 526, the left and right ball joints 552A and 552B, the tie rods 527A and 527B, the knuckles 528A and 528B, and the left and right tires 529A and 529B.

The steering shaft 522 is a shaft extending from the steering wheel 521 steered by a steering operator. One end portion of the input shaft 524a is connected to an end portion of the steering shaft 522 on a side opposite to a side connected to the steering wheel 521 via the universal joints 523A and 523B. By the above, the steering wheel 521 is coupled to the input shaft 524a via the universal joints 523A and 523B and the steering shaft 522. The output shaft 524b is coupled to the input shaft 524a via a torsion bar 546 described later. More specifically, one end portion of the output shaft 524b is connected to another end portion of the input shaft 524a via the torsion bar 546. Another end portion of the output shaft 524b is coupled to the rack shaft 526 via the rack and pinion mechanism 525.

The input shaft 524a and the output shaft 524b are coaxially arranged. The input shaft 524a and the output shaft 524b are rotatable about the same central axis. The input shaft 524a and the output shaft 524b are relatively rotatable with respect to each other in a range in which the torsion bar 546 described later can be twisted.

The auxiliary mechanism unit 540 includes a steering torque sensor 541, a steerage angle sensor 542, a motor 543, a deceleration mechanism 544, an inverter 545, and the torsion bar 546. That is, the steering mechanism 530 includes the steering torque sensor 541, the steerage angle sensor 542, the motor 543, the deceleration mechanism 544, the inverter 545, and the torsion bar 546. The torsion bar 546 couples the input shaft 524a and the output shaft 524b. The torsion bar 546 is arranged coaxially with the input shaft 524a and the output shaft 524b. In description below, a virtual axis passing through a common central axis of the input shaft 524a, the output shaft 524b, and the torsion bar 546 is referred to as a rotation axis R. The torsion bar 546 can be twisted around the rotation axis R.

The steering torque sensor 541 detects the steering torque Th in the steering mechanism unit 520 by detecting an amount of torsion around the rotation axis R of the torsion bar 546. The steering torque Th is a torsion bar torque generated in the torsion bar 546, and is a torsional moment around the rotation axis R. The steerage angle sensor 542 can detect a rotation angle $\theta a$ around the rotation axis R of the input shaft 524a. The rotation angle $\theta a$ of the input shaft 524a is equal to a steerage angle $\theta h$ of the steering wheel 521. That is, the steerage angle sensor 542 can detect the steerage angle $\theta h$ of the steering wheel 521 by detecting the rotation angle $\theta a$ of the input shaft 524a. A rotation angle $\theta b$ of the output shaft 524b can be detected based on the steering torque sensor 541 and the steerage angle sensor 542. The rotation angle $\theta b$ of the output shaft 524b is a steering angle $\theta s$.

For example, the inverter 545 converts DC power into three-phase alternating-current power having U-phase, V-phase, and W-phase pseudo sine waves in accordance with a motor driving signal input from the control device 100 and supplies the power to the motor 543. The motor 543 is connected to the output shaft 524b via the deceleration mechanism 544. Three-phase AC power is supplied from the inverter 545 to the motor 543. The motor 543 is, for example, an interior permanent magnet synchronous motor (IPMSM), a surface mounted permanent magnet synchronous motor (SPMSM), a switched reluctance motor (SRM), or the like. When three-phase AC power is supplied from the inverter 545, the motor 543 generates an auxiliary torque according to the steering torque Th. The motor 543 transmits the generated auxiliary torque to the output shaft 524b via the deceleration mechanism 544.

The control device 100 controls a portion including at least the motor 543 in the steering mechanism 530 mounted on a vehicle as a control target 560. In the present example embodiment, the control target 560 includes the steering mechanism unit 520, the torsion bar 546, the motor 543, and the deceleration mechanism 544. Since the control target 560 includes the input shaft 524a and the output shaft 524b that can rotate relative to each other via the torsion bar 546, a motion of the control target 560 cannot be described only by a simple equation of motion of a one-inertia system. The control target 560 changes between a one-inertia system and a two-inertia system depending on strength with which a steering operator grips the steering wheel 521. The stronger a steering operator grips the steering wheel 521, the closer the control target 560 is to a one-inertia system. The weaker a steering operator grips the steering wheel 521, the closer the control target 560 is to a two-inertia system. As described above, the control target 560 includes a two-inertia system.

The control device 100 is electrically connected to the inverter 545. The control device 100 generates a motor driving signal based on a detection signal detected by the steering torque sensor 541, the steerage angle sensor 542, a vehicle speed sensor 300 mounted on a vehicle, and the like and outputs the motor driving signal to the inverter 545. The control device 100 controls the control target 560 by controlling rotation of the motor 543 via the inverter 545. More specifically, the control device 100 controls switching operation of a plurality of switching elements included in the inverter 545. Specifically, the control device 100 generates a control signal for controlling switching operation of each switching element and outputs the control signal to the inverter 545. Each switching element is, for example, a metal-oxide-semiconductor field-effect transistor (MOS-FET). In description below, a control signal for controlling switching operation of each switching element is referred to as a "gate control signal".

The control device 100 generates a torque command value based on the steering torque Th and the like, and controls a torque of the motor 543 and a rotation speed of the motor 543 by, for example, vector control. The vector control is a method in which current flowing through the motor 543 is separated into a current component that contributes to generation of a torque and a current component that contributes to generation of a magnetic flux, and the current components orthogonal to each other are independently controlled. The control device 100 can perform not only the vector control but also other closed-loop control. A rotation speed of the motor 543 is represented by, for example, a rotation speed [revolutions per minute (rpm)] at which a rotor rotates in one minute, a rotation speed [revolutions per second (rps)] at which a rotor rotates in one second, or the like.

Note that a value of the steering torque Th may be directly input to the control device 100 from the steering torque sensor 541, or the control device 100 may calculate a value of the steering torque Th from an output value of the steering torque sensor 541. A value of the steerage angle θh of the steering wheel 521 may be directly input to the control device 100 from the steerage angle sensor 542, or the control device 100 may calculate a value of the steerage angle θh from an output value of the steerage angle sensor 542.

Further, the control device 100 and the motor 543 are modularized and manufactured and sold as a motor module. The motor module includes the motor 543 and the control device 100, and is suitably used for the electric power steering device 1000. Further, the control device 100 may be manufactured and sold as a control device for controlling the electric power steering device 1000 independently of the motor 543.

FIG. 2 illustrates a typical example of a configuration of the control device 100 according to the present example embodiment. The control device 100 includes a power source circuit 111, an angle sensor 112, an input circuit 113, a communication I/F 114, a driving circuit 115, a ROM 116, and a processor 200, for example. The control device 100 may be realized as a printed circuit board (PCB) on which these electronic components are mounted.

In the processor 200, the vehicle speed sensor 300 mounted on a vehicle, the steering torque sensor 541, and the steerage angle sensor 542 are communicably connected to the processor 200. A vehicle speed is transmitted from the vehicle speed sensor 300 to the processor 200. The steering torque Th is transmitted from the steering torque sensor 541 to the processor 200. The steerage angle θh is transmitted from the steerage angle sensor 542 to the processor 200.

The processor 200 is a semiconductor integrated circuit, and is also referred to as a central processing unit (CPU) or a microprocessor. The processor 200 sequentially executes computer programs which are stored in the ROM 116 and describe commands for controlling motor driving, and realizes desired processing. In addition to the processor 200 or instead of the processor 200, the control device 100 may include a field programmable gate array (FPGA) equipped with a CPU, a graphics processing unit (GPU), an application specific integrated circuit (ASIC), an application specific standard product (ASSP), or a combination of two or more circuits selected from these circuits. The processor 200 sets a current command value according to an actual current value, a rotation angle of a rotor of the motor 543, and the like, generates a pulse width modulation (PWM) signal, and outputs the PWM signal to the driving circuit 115.

The power source circuit 111 is connected to an external power source (not illustrated). The power source circuit 111 generates DC voltage necessary for each unit of the control device 100. The DC voltage generated in the power source circuit 111 is, for example, 3 V or 5 V.

The angle sensor 112 detects a rotation angle of a rotor in the motor 543, and outputs the rotation angle to the processor 200. The angle sensor 112 may be a resolver, a Hall element such as a Hall IC, or an MR sensor having a magnetoresistive element. The processor 200 can calculate an angular velocity ω[rad/s] of the motor 543 based on an electrical angle θm of the motor 543 obtained based on the angle sensor 112. Note that the control device 100 may include, instead of the angle sensor 112, a speed sensor capable of detecting a rotation angular velocity of the motor 543 and an acceleration sensor capable of detecting a rotation angular acceleration of the motor 543.

A motor current value detected by a current sensor (not illustrated) is input to the input circuit 113. In description below, a motor current value detected by a current sensor (not illustrated) is referred to as an "actual current value". The input circuit 113 converts a level of an input actual current value into an input level of the processor 200 as necessary, and outputs the actual current value to the processor 200. A typical example of the input circuit 113 is an analog-digital conversion circuit.

The communication I/F 114 is, for example, an input and output interface for transmitting and receiving data in conformity with an in-vehicle controller area network (CAN).

The driving circuit 115 is typically a gate driver or a pre-driver. The driving circuit 115 generates a gate control signal in accordance with a PWM signal and gives a gate control signal to gates of a plurality of switching elements included in the inverter 545. For example, when the motor 543 to be driven is a motor that can be driven at low voltage, the driving circuit 115 as a gate driver is not necessarily required in some cases. In that case, a function of a gate driver in the driving circuit 115 may be implemented in the processor 200.

The ROM 116 is electrically connected to the processor 200. The ROM 116 is a writable memory, a rewritable memory, or a read-only memory, for example. Examples of the writable memory include a programmable read only memory (PROM). Examples of the rewritable memory include a flash memory and an electrically erasable programmable read only memory (EEPROM). The ROM 116 stores a control program including a command group for causing the processor 200 to control motor driving. For example, the control program stored in the ROM 116 is once loaded into a RAM (not illustrated) at the time of booting.

Figure 3:
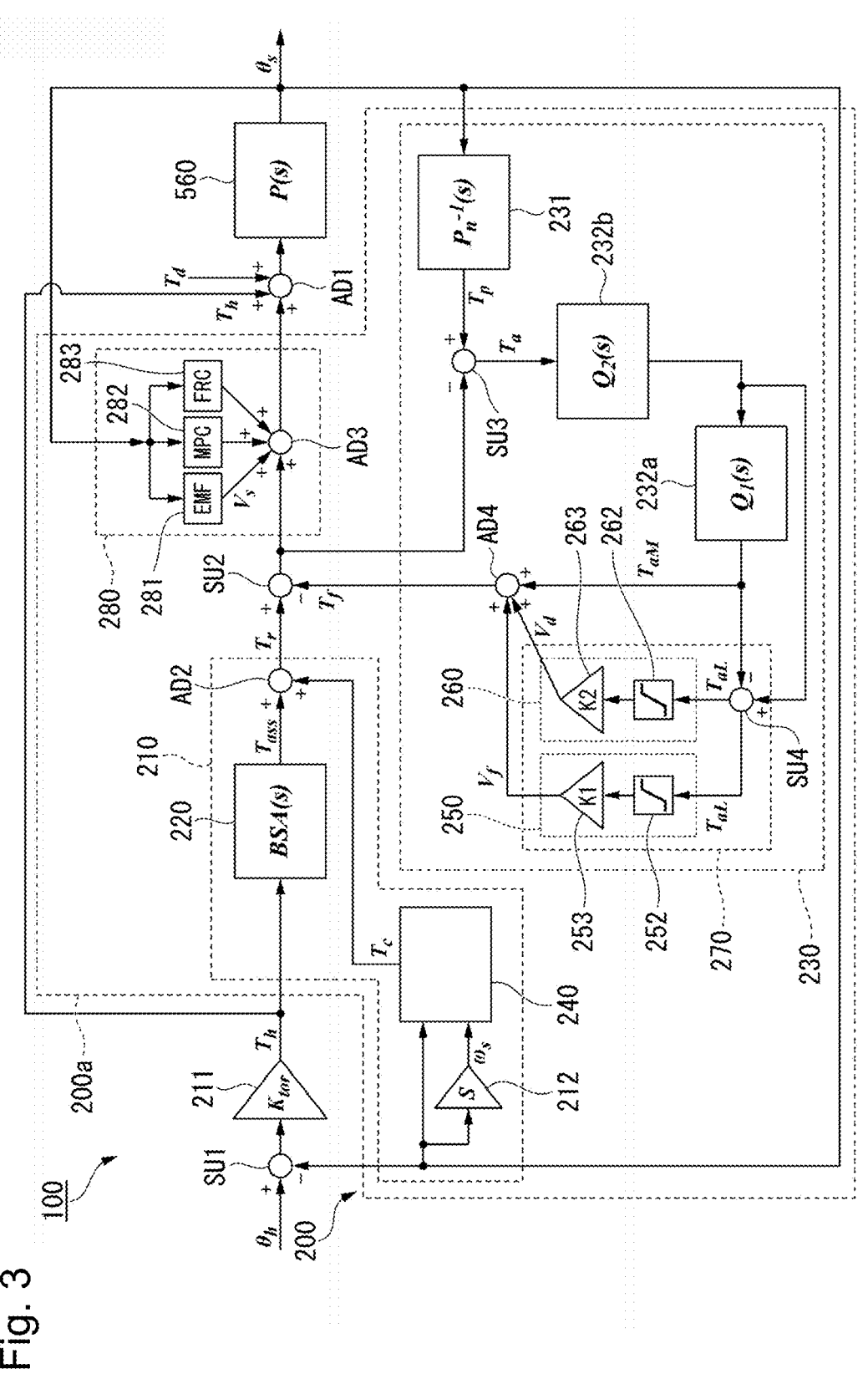
FIG. 3 is a functional block diagram illustrating a function of a processor in a control device according to an example embodiment of the present disclosure.

FIG. 3 illustrates an example of a functional block of the processor 200 according to the present example embodiment. The processor 200, which is a computer, sequentially executes processing or tasks necessary for controlling the motor 543 using each functional block. Each functional block of the processor 200 illustrated in FIG. 3 may be implemented in the processor 200 as software such as firmware, may be implemented in the processor 200 as hardware, or may be implemented in the processor 200 as software and hardware. Processing of each functional block in the processor 200 is typically described in a computer program in units of software modules and stored in the ROM 116. However, in a case where an FPGA or the like is used, all or a portion of the functional blocks may be implemented as a hardware accelerator. Further, a control method of the control device 100 according to the present example embodiment is implemented in a computer, and can be implemented by causing the computer to execute desired operation.

The processor 200 includes a controller 200a, a subtractor SU1, a torque conversion unit 211, and an adder AD1. The controller 200a includes a reaction force controller 210, a model following controller 230, a state feedback unit 280, and a subtractor SU2. That is, the control device 100 includes the reaction force controller 210, the model following controller 230, the state feedback unit 280, the subtractors SU1 and SU2, and the adder AD1. In other words, functions corresponding to the reaction force controller 210, the model following controller 230, the state feedback unit 280, the subtractors SU1 and SU2, and the adder AD1 are implemented in the processor 200 of the control device 100.

The steerage angle $\theta h$ detected based on the steerage angle sensor 542 is input to the subtractor SU1. The subtractor SU1 subtracts the steering angle $\theta s$ detected based on the steering torque sensor 541 and the steerage angle sensor 542 from the steerage angle $\theta h$, and outputs a result to the torque conversion unit 211.

A value output from the subtractor SU1 is input to the torque conversion unit 211. The torque conversion unit 211 multiplies a gain to a value output from the subtractor SU1 and outputs the steering torque Th. A gain in the torque conversion unit 211 is equal to a spring constant Ktor of the torsion bar 546. A value obtained by multiplying a difference between the steerage angle $\theta h$ and the steering angle $\theta s$ by the spring constant Ktor of the torsion bar 546 is a torsion bar torque, that is, the steering torque Th. The steering torque Th is input to the adder AD1 and the reaction force controller 210.

The reaction force controller 210 generates an input torque Tr input to the control target 560 based on the steerage angle $\theta h$ and the steering angle $\theta s$. The input torque Tr is a target torque of the motor 543 and is a torque command value. The reaction force controller 210 generates the input torque Tr and controls a torque of the motor 543 to control reaction force transmitted from the steering wheel 521 to a steering operator.

The reaction force controller 210 includes a differentiator 212, a base assist controller 220, a vehicle stabilization compensator 240, and an adder AD2. That is, the control device 100 includes the differentiator 212, the base assist controller 220, the vehicle stabilization compensator 240, and the adder AD2.

Figures 4, 5:
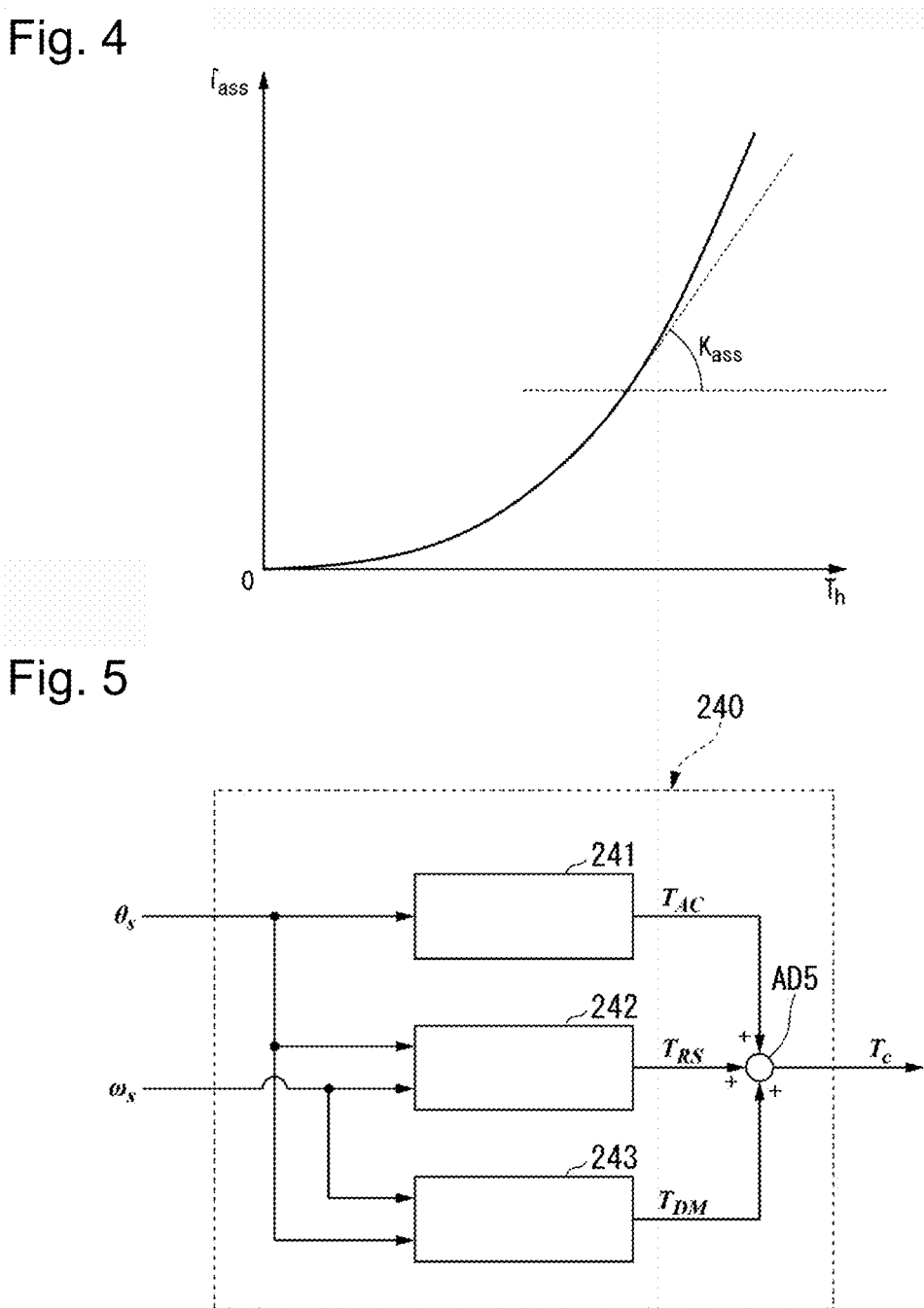
FIG. 4 is a graph illustrating an example of a relationship between a steerage angle and an assist torque according to an example embodiment of the present disclosure.
FIG. 5 is a functional block diagram illustrating a function of a vehicle stabilization compensator according to an example embodiment of the present disclosure.

The steering torque Th output from the torque conversion unit 211 is input to the base assist controller 220. The base assist controller 220 generates an assist torque Tass to compensate for at least a portion of a self-aligning torque TSAT generated in the tires 529A and 529B of a vehicle based on a torsion bar torque generated in the torsion bar 546, that is, the steering torque Th. In the present example embodiment, the base assist controller 220 outputs the assist torque Tass by multiplying the steering torque Th by an assist gain Kass. FIG. 4 illustrates an example of a relationship between the steering torque Th and the assist torque Tass. In the graph of FIG. 4, the horizontal axis represents the steering torque Th, the vertical axis represents the assist torque Tass, and an inclination of the assist torque Tass with respect to the steering torque Th is the assist gain Kass. The steering torque Th, the assist torque Tass, and the assist gain Kass satisfy a relationship of dTass/dTh=Kass. As illustrated in FIG. 4, the assist torque Tass increases exponentially as the steering torque Th increases, for example. As illustrated in FIG. 3, the assist torque Tass output from the base assist controller 220 is input to the adder AD2.

The steering angle $\theta s$ and a steering angular velocity $\omega s$ calculated by differentiating the steering angle $\theta s$ by the differentiator 212 are input to the vehicle stabilization compensator 240. As illustrated in FIG. 5, the vehicle stabilization compensator 240 includes an active return controller 241, a return speed controller 242, a damper controller 243, and an adder AD5.

The active return controller 241 performs active return control to automatically return an angle of the steering wheel 521, that is, the steerage angle $\theta h$, to a predetermined reference angle. The predetermined reference angle is the steerage angle $\theta h$ at which the steering wheel 521 is located at a center position. The steering angle $\theta s$ is input to the active return controller 241. The active return controller 241 outputs a torque TAC for performing active return control based on the steering angle $\theta s$.

The return speed controller 242 is a portion that performs return speed control. The return speed control is control for adjusting an angle of the steering wheel 521 by the active return control, that is, a speed of the steerage angle $\theta h$ when the steerage angle $\theta h$ returns to a predetermined reference angle, that is, a steerage angular velocity wh. The return speed control is performed, for example, to prevent that the steering wheel 521 returns too fast by the active return control, the steerage angle $\theta h$ overshoots with respect to a reference angle, and a vehicle body wobbles. The steering angle $\theta s$ and the steering angular velocity $\omega s$ are input to the return speed controller 242. The return speed controller 242 outputs a torque TRS for performing the return speed control based on the steering angle $\theta s$ and the steering angular velocity $\omega s$. The return speed control is also called convergence control.

In the present example embodiment, control for returning an angle of the steering wheel 521 to a predetermined reference angle is executed by the active return control and the return speed control. That is, in the present example embodiment, the control device 100 can execute control to return an angle of the steering wheel 521 to a predetermined reference angle by the active return controller 241 and the return speed controller 242. For example, in a case where a traveling speed of a vehicle is high, the self-aligning torque TSAT generated in the tires 529A and 529B is large, and an angle of the steering wheel 521 easily returns to a reference angle by the self-aligning torque TSAT. For this reason, in a case where a traveling speed of a vehicle is high, a control amount by the active return control is smaller than that in a case where a traveling speed of the vehicle is low. The self-aligning torque TSAT means a torque that acts in a direction in which the steering wheel 521 returns by elasticity of the tires 529A and 529B that are twisted when the steering wheel 521 is turned.

The damper controller 243 is a portion that performs damper control to brake movement of the steering wheel 521 according to a speed at which the steering wheel 521 is steered. The steering angle $\theta s$ and the steering angular velocity $\omega s$ are input to the damper controller 243. The damper controller 243 outputs a torque TDM for performing damper control based on the steering angle $\theta s$ and the steering angular velocity $\omega s$.

The adder AD5 adds the torque TAC output from the active return controller 241, the torque TRS output from the return speed controller 242, and the torque TDM output from the damper controller 243, and outputs a compensation torque Tc. The compensation torque Tc is output of the vehicle stabilization compensator 240. As illustrated in FIG. 3, the compensation torque Tc is input to the adder AD2.

Instead of the steering angle θs and the steering angular velocity ωs, the steerage angle θh and the steerage angular velocity ωh may be input to the vehicle stabilization compensator 240. In this case, the active return controller 241 outputs the torque TAC for performing the active return control based on the steerage angle θh. The return speed controller 242 outputs the torque TRS for performing the return speed control based on the steerage angle θh and the steerage angular velocity ωh. The damper controller 243 outputs the torque TDM for performing the damper control based on the steerage angle θh and the steerage angular velocity ωh.

The adder AD2 adds the assist torque Tass and the compensation torque Tc, and outputs the input torque Tr input to the control target 560. The input torque Tr is input to the subtractor SU2.

The model following controller 230 generates a correction torque Tf for correcting the input torque Tr based on output of the control target 560 and a nominal model based on a configuration of the control target 560. In the present example embodiment, the correction torque Tf is a feedback torque fed back to the input torque Tr. The nominal model is an internal model used as a model that restricts the control target 560 when the control target 560 is controlled. The nominal model will be described in detail later. The model following controller 230 is a model following controller configured to perform model following control. A specific configuration of the model following controller 230 will be described in detail later.

The subtractor SU2 subtracts the correction torque Tf output from the model following controller 230 from the input torque Tr. Output from the subtractor SU2 is input to an adder AD3 and the model following controller 230. The adder AD3 outputs a value obtained by adding output from the state feedback unit 280 to output from the subtractor SU2 to the adder AD1. The adder AD1 outputs a value obtained by adding the steering torque Th and a disturbance torque Td to output from the adder AD3 to the control target 560.

The disturbance torque Td is a difference between an actual output torque of the motor 543 and an ideal output torque of the motor 543. The disturbance torque Td includes a disturbance torque externally applied to the control target 560. The disturbance torque Td includes, for example, an extra torque generated by friction and rattling due to mechanical elements such as the motor 543 and the deceleration mechanism 544, torque ripple generated in the motor 543, the self-aligning torque TSAT, and a disturbance torque that may be generated when traveling on an unpaved rattling road, a gravel road, or the like.

In the present example embodiment, the model following controller 230 generates the correction torque Tf based on the steering angle θs, and feeds back the correction torque Tf to the input torque Tr. The model following controller 230 includes an inverse nominal model 231, a first filter 232a, a second filter 232b, an assist adjustment unit 270, subtractors SU3 and SU4, and an adder AD4. In the present example embodiment, the first filter 232a is a high-pass filter. The first filter 232a has a first cutoff frequency Cf1. The first cutoff frequency Cf1 is, for example, 2 Hz or more and 10 Hz or less. In the present example embodiment, the first cut-off frequency Cf1 is higher than 5 Hz and lower than 10 Hz.

In the present example embodiment, the second filter 232b is a low-pass filter. The second filter 232b has a second cutoff frequency Cf2 higher than the first cutoff frequency Cf1. The second cutoff frequency Cf2 is, for example, 3 Hz or more and 50 Hz or less. However, an upper limit of the second cutoff frequency Cf2 may be set in a range of about 140 Hz or more and 200 Hz or less. The order of the second filter 232b is three or more. The second filter 232b may include, for example, a plurality of low-pass filters. The first filter 232a and the second filter 232b are coupled in series.

The model following controller 230 is configured such that a transfer function P(s) of the control target 560 is restricted to a transfer function Pn(s) of a nominal model in a frequency band in which a complementary sensitivity gain GT, which is a gain in a gain characteristic of a complementary sensitivity function T(s) with respect to a modeling error between the control target 560 and the nominal model, is approximately one. That the "complementary sensitivity gain GT is approximately one" includes, for example, a case where the complementary sensitivity gain GT is 0.8 or more and 1.2 or less in addition to a case where the complementary sensitivity gain GT is one. The numerical range is, for example, a range in which a gain of a substantial disturbance reduction characteristic can be adjusted to one in consideration of positive efficiency and reverse efficiency of a worm gear in a case where the deceleration mechanism 544 connected to the motor 543 includes the worm gear. Since efficiency of the worm gear is about 0.8, it is necessary to adjust the gain by ±0.2 with respect to a target value of one.

Figure 6:
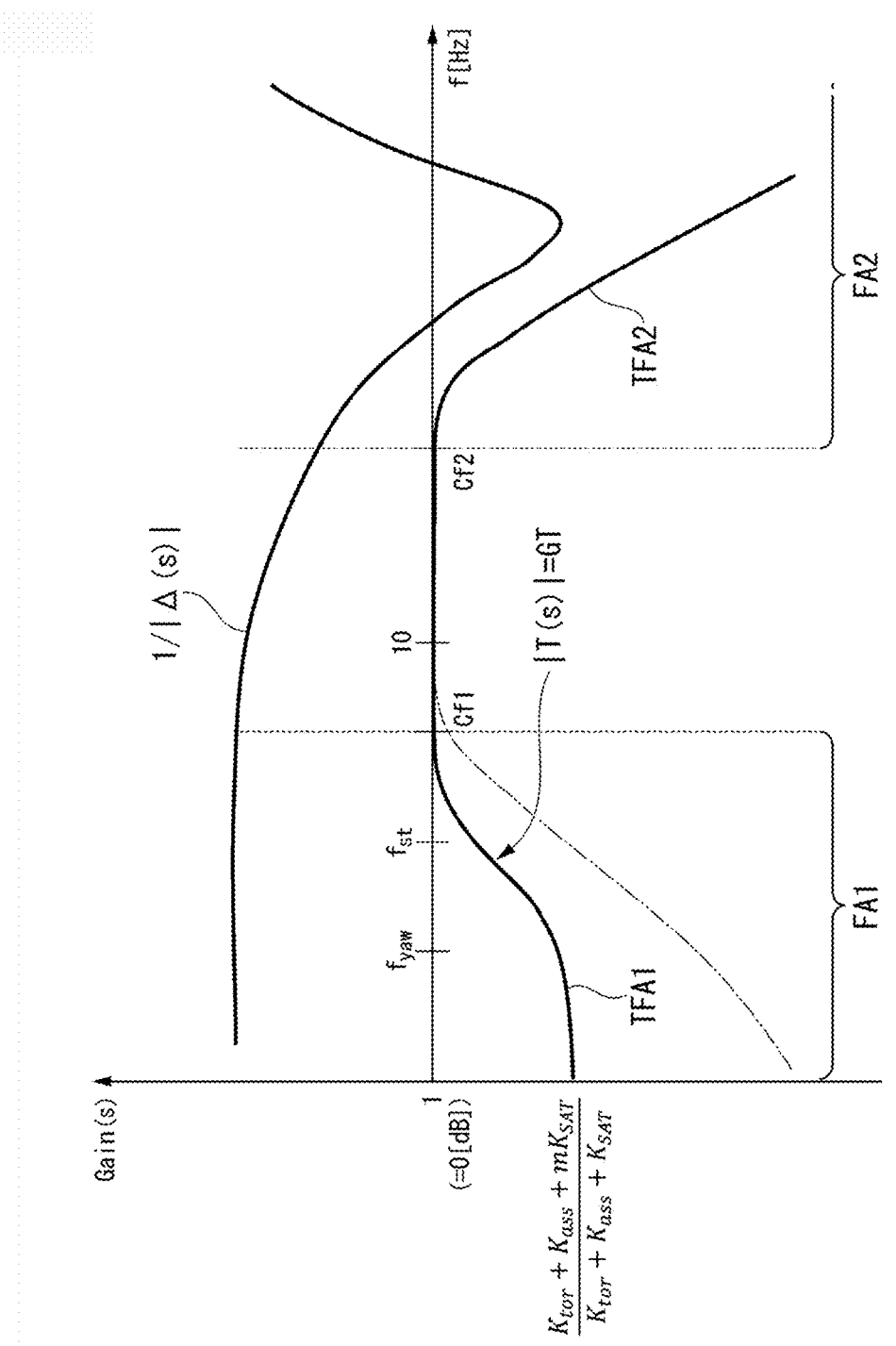
FIG. 6 is a graph illustrating a gain characteristic of a complementary sensitivity function and a gain characteristic of a reciprocal of a modeling error between a transfer function of a control target and a transfer function of a nominal model.

The complementary sensitivity function T(s) is a complementary sensitivity function of an inner loop including the model following controller 230. FIG. 6 illustrates the complementary sensitivity gain GT in the complementary sensitivity function T(s). The complementary sensitivity gain GT is a gain of the complementary sensitivity function T(s) as a transfer function, and is an absolute value of the complementary sensitivity function T(s). As illustrated in FIG. 6, the complementary sensitivity function T(s) has a gain of 0 dB, that is, the complementary sensitivity gain GT in a transfer function is one in a frequency band where a frequency f is equal to or more than the first cutoff frequency Cf1 and equal to or less than the second cutoff frequency Cf2. That is, the first cutoff frequency Cf1 is a lower limit value of a frequency band in which the complementary sensitivity gain GT is one. The second cutoff frequency Cf2 is an upper limit value of a frequency band in which the complementary sensitivity gain GT is one. Note that, in the present description, that a "transfer function of a control target is restricted to a transfer function of a nominal model" means that, for example, the control target is controlled such that the transfer function of the control target appears to be a transfer function of the nominal model in appearance when an input and output relationship is viewed.

The transfer function P(s) of the control target 560 is a plant characteristic for which model following control is performed. The transfer function P(s) of the control target 560 is expressed by, for example, Formula (1) below.

Mathematical formula 1

$$P(s) = \frac{1}{Js^2 + Bs + K_{SAT}} \tag{1}$$

where s is a Laplace variable, J is a parameter representing the moment of inertia of the steering mechanism unit 520, and B is a parameter representing a viscous friction coeffi-

Figure 7:
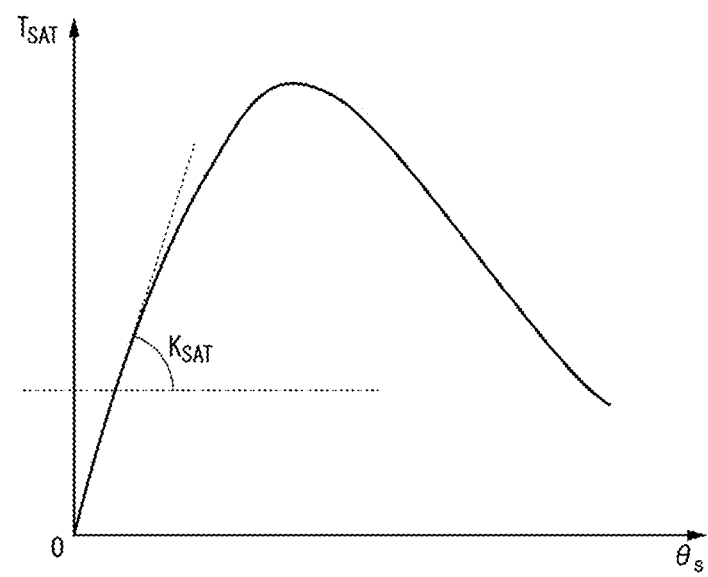
FIG. 7 is a graph illustrating an example of a relationship between a steering angle and a self-aligning torque.

11 cient of the steering mechanism unit 520. KSAT is a self-aligning torque gain. The self-aligning torque gain KSAT is an inclination of the self-aligning torque TSAT generated in the tires 529A and 529B of a vehicle with respect to the steering angle θs. FIG. 7 illustrates an example of a relationship between the self-aligning torque TSAT and the steering angle θs. In a graph of FIG. 7, the horizontal axis represents the steering angle θs, the vertical axis represents the self-aligning torque TSAT, and an inclination of the self-aligning torque TSAT with respect to the steering angle θs is the self-aligning torque gain KSAT. The steering angle θs, the self-aligning torque TSAT, and the self-aligning torque gain KSAT satisfy a relationship of dTSAT/dθs=KSAT. As illustrated in FIG. 7, for example, the self-aligning torque TSAT increases as the steering angle θs increases up to a certain degree of the steering angle θs, and decreases as the steering angle θs increases when the steering angle θs becomes a certain degree or more.

The inverse nominal model 231 is an inverse model of a predetermined nominal model used to restrict the control target 560. The transfer function Pn(s) of a nominal model is expressed by, for example, Formula (2) below. A transfer function Pn−1(s) of the inverse nominal model 231 is expressed by, for example, Formula (3) below.

Mathematical formula 2

$$P_n(s) = \frac{1}{J_n s^2 + B_n s} \quad (2)$$

Mathematical formula 3

$$P_n^{-1}(s) = J_n s^2 + B_n s \quad (3)$$

In Formulas (2) and (3), s is a Laplace variable, Jn is a parameter representing the moment of inertia of a nominal model, and Bn is a parameter representing a viscous friction coefficient of the nominal model. Note that the transfer function Pn(s) of a nominal model and the transfer function Pn−1(s) of the inverse nominal model 231 are not limited to the examples illustrated in Formulas (2) and (3), and are not particularly limited.

As illustrated in FIG. 3, output of the control target 560 is input to the inverse nominal model 231. Specifically, the steering angle θs is input to the inverse nominal model 231. The inverse nominal model 231 outputs a torque Tp based on Formula (3) above and the input steering angle θs. That is, the model following controller 230 calculates the torque Tp by using a nominal model based on output of the control target 560. The torque Tp is equal to a value of a torque input to a nominal model in a case where an output value of the nominal model is the same value as an output value of the control target 560.

The subtractor SU3 subtracts output of the subtractor SU2 from output of the inverse nominal model 231 to generate a differential torque Ta. That is, the subtractor SU3 generates the differential torque Ta by subtracting, from the torque Tp, the input torque Tr before a state compensation value Vs described later is fed back after the correction torque Tf is fed back. The differential torque Ta is, for example, an estimation value of the disturbance torque Td. The differential torque Ta output from the subtractor SU3 is input to the second filter 232b and subjected to low-pass filter processing, and then input to the first filter 232a and subjected to high-pass filter processing. The differential torque Ta subjected to the filter processing by the first filter 232a and the second filter 232b is input to the adder AD4. The differential torque Ta subjected to the filter processing by the first filter 232a and the second filter 232b is in a state in which a frequency component lower than the first cutoff frequency Cf1 and a frequency component higher than the second cutoff frequency Cf2 are removed. That is, the differential torque Ta subjected to the filter processing by the first filter 232a and the second filter 232b is a frequency component TaM of the first cut-off frequency Cf1 or more and the second cut-off frequency Cf2 or less.

The assist adjustment unit 270 generates a compensation value for friction and disturbance and adjusts the differential torque Ta. In the present example embodiment, the assist adjustment unit 270 adjusts the frequency component TaM of the differential torque Ta. The assist adjustment unit 270 is coupled in parallel to the first filter 232a. The assist adjustment unit 270 includes a friction compensation value calculation unit 250, a disturbance compensation value calculation unit 260, and the subtractor SU4.

The subtractor SU4 subtracts an output value from the first filter 232a from an output value from the second filter 232b. Here, the output value from the second filter 232b is a value obtained by removing a frequency component higher than the second cutoff frequency Cf2 from the differential torque Ta. The output value from the first filter 232a is a value obtained by removing a frequency component higher than the second cutoff frequency Cf2 and a frequency component lower than the first cutoff frequency Cf1 from the differential torque Ta. Therefore, a value output from the subtractor SU4 is a frequency component TaL lower than the first cutoff frequency Cf1 in the differential torque Ta. Output of the subtractor SU4 is input to the friction compensation value calculation unit 250 and the disturbance compensation value calculation unit 260. The frequency component TaL includes frictional force, a self-aligning torque, a disturbance torque caused by backlash of the control target 560, torque ripple generated in the control target 560, and the like.

The friction compensation value calculation unit 250 calculates a friction compensation value Vf to compensate for at least a portion of frictional force generated in the control target 560 based on the differential torque Ta. As described above, a value from the subtractor SU4 input to the friction compensation value calculation unit 250 is the frequency component TaL lower than the first cutoff frequency Cf1 in the differential torque Ta. Therefore, in the present example embodiment, the friction compensation value calculation unit 250 calculates the friction compensation value Vf based on a component having a frequency lower than the first cutoff frequency Cf1 in the differential torque Ta.

The friction compensation value calculation unit 250 includes a limiter 252 and a gain adjuster 253. The limiter 252 limits an output value from the subtractor SU4. The limiter 252 clips an input value to an upper or lower threshold in a case where an input value exceeds the upper or lower threshold. The gain adjuster 253 multiplies an output value from the limiter 252 by a gain K1. The friction compensation value calculation unit 250 calculates the friction compensation value Vf by applying limitation by the limiter 252 and the gain K1 to a component having a frequency lower than the first cutoff frequency Cf1 in the differential torque Ta. A threshold of the limiter 252 and a value of the gain K1 are determined in advance based on, for example, frictional force actually generated in the control target 560.

The friction compensation value Vf output from the friction compensation value calculation unit 250 is a value to compensate for at least a portion of a frictional force component included in the frequency component TaL of the differential torque Ta. In general, since appropriate friction is required for the control target 560, the friction compensation value calculation unit 250 calculates a value smaller than frictional force actually generated in the control target 560 as the friction compensation value Vf. This makes it possible to achieve highly accurate friction compensation while maintaining appropriate frictional force on the control target 560. A target of friction compensation using the friction compensation value Vf is, for example, friction of the motor 543, friction of the deceleration mechanism 544, a left and right difference in friction of the deceleration mechanism 544, and the like.

Here, the frequency component TaL of the differential torque Ta includes, in addition to a frictional force component, a self-aligning torque generated in the control target 560, a disturbance torque caused by backlash generated in the control target 560, and torque ripple generated in the control target 560. Therefore, the friction compensation value Vf obtained by processing of the frequency component TaL by the limiter 252 and the gain adjuster 253 also includes a compensation value for compensating at least a portion of a self-aligning torque generated in the control target 560, a disturbance torque caused by backlash generated in the control target 560, and torque ripple generated in the control target 560.

A vehicle equipped with the electric power steering device 1000 can travel according to a travel mode including an automatic driving mode and a manual driving mode. In this case, the gain K1 of the gain adjuster 253 may be switched according to the travel mode. The greater the gain K1 of the gain adjuster 253, the greater the degree of friction reduction. The gain K1 in the automatic driving mode is preferably larger than the gain K1 set in the manual driving mode. By the above, it is possible to apply optimum friction compensation to the automatic driving mode in which friction reduction is more required.

The disturbance compensation value calculation unit 260 calculates a disturbance compensation value Vd for compensating at least a portion of a self-aligning torque generated in the control target 560. In the present example embodiment, the disturbance compensation value Vd includes a compensation value for compensating at least a portion of frictional force generated in the control target 560, a disturbance torque caused by backlash generated in the control target 560, and torque ripple generated in the control target 560. The disturbance compensation value calculation unit 260 calculates the disturbance compensation value Vd based on the differential torque Ta that is a difference between the torque Tp output from the inverse nominal model 231 and the input torque Tr. That is, the disturbance compensation value calculation unit 260 calculates the disturbance compensation value Vd based on the differential torque Ta that is a difference between the torque Tp calculated using a nominal model based on output of the control target 560 and the input torque Tr. As described above, a value from the subtractor SU4 input to the disturbance compensation value calculation unit 260 is a frequency component lower than the first cutoff frequency Cf1 in the differential torque Ta. Therefore, in the present example embodiment, the disturbance compensation value calculation unit 260 calculates the disturbance compensation value Vd based on a component having a frequency lower than the first cutoff frequency Cf1 in the differential torque Ta.

The disturbance compensation value calculation unit 260 includes a limiter 262 and a gain adjuster 263. The limiter 262 limits an output value from the subtractor SU4. The limiter 262 clips an input value to an upper or lower threshold in a case where an input value exceeds the upper or lower threshold. A threshold of the limiter 262 is different from a threshold of the limiter 252, for example. The gain adjuster 263 multiplies an output value from the limiter 262 by the gain K2. A maximum value of the gain K2 of the gain adjuster 263 is determined under a condition that the transfer function P(s) of the control target 560 is restricted to the transfer function Pn(s) of a nominal model. A value of the gain K2 is different from a value of the gain K1, for example. A value of the gain K2 is, for example, about 0.1 or more and 0.8 or less. The gain K2 of the gain adjuster 263 may be switched according to a travel mode of a vehicle.

The disturbance compensation value Vd is a value to compensate for at least a portion of a self-aligning torque component included in the frequency component TaL of the differential torque Ta. For example, the disturbance compensation value calculation unit 260 calculates a value corresponding to about half of the self-aligning torque TSAT actually generated in the control target 560 as the disturbance compensation value Vd. The self-aligning torque TSAT actually generated in the control target 560 is experimentally obtained in advance for each frequency, for example. A threshold of the limiter 262 of the disturbance compensation value calculation unit 260 and a value of the gain K2 are adjusted to a value at which the disturbance compensation value Vd is calculated as a value about 0.1 times or more and 0.8 times or less the magnitude of the self-aligning torque TSAT obtained in advance. The disturbance compensation value Vd calculated by the disturbance compensation value calculation unit 260 is a value different from the friction compensation value Vf calculated by the friction compensation value calculation unit 250.

Here, the frequency component TaL of the differential torque Ta includes, in addition to the self-aligning torque TSAT, frictional force generated in the control target 560, a disturbance torque caused by backlash generated in the control target 560, and torque ripple generated in the control target 560. For this reason, the disturbance compensation value Vd obtained by processing of the frequency component TaL by the limiter 262 and the gain adjuster 263 also includes a compensation value for compensating at least a portion of frictional force generated in the control target 560, a disturbance torque caused by backlash generated in the control target 560, and torque ripple generated in the control target 560.

In order to apply friction compensation and disturbance compensation performed in the assist adjustment unit 270 to the correction torque Tf used for model following control in the model following controller 230, it is necessary to pay attention to a stability condition of the model following control. This condition is that a gain in a gain characteristic of a transfer function of the assist adjustment unit 270 restricted to a characteristic considering stability does not exceed one according to a small gain theorem described later. This is derived from a design condition of the second filter 232b. In the present example embodiment, the subtractor SU4 is provided in a preceding stage of the limiters 252 and 262 such that a value of the gains K1 and K2 in the gain adjusters 253 and 263 is one at maximum and a gain in a gain characteristic is one under this condition, and subtraction processing is applied. In other words, the assist adjustment unit 270 behaves as a low-pass filter having a transfer function of 1−Q1(s). Q1(s) is a transfer function of the first filter 232*a* that is a high-pass filter. The assist adjustment unit 270 performs low-pass filter processing having a transfer function of 1–Q1(s) on a torque output from the second filter 232*b*, and adjusts the processed value in each of the friction compensation value calculation unit 250 and the disturbance compensation value calculation unit 260 and outputs the value.

The adder AD4 adds an output value from the assist adjustment unit 270 to an output value from the first filter 232*a*. That is, the adder AD4 adds the friction compensation value Vf and the disturbance compensation value Vd to the frequency component TaM. The adder AD4 outputs the correction torque Tf calculated by adding the frequency component TaM, the friction compensation value Vf, and the disturbance compensation value Vd. The correction torque Tf output from the adder AD4 is fed back to input of the control target 560, that is, the input torque Tr. As described above, in the present example embodiment, the model following controller 230 adds the friction compensation value Vf and the disturbance compensation value Vd to the differential torque Ta from which a frequency component lower than the first cutoff frequency Cf1 is removed by the first filter 232*a* that is a high-pass filter, that is, the frequency component TaM, to generate the correction torque Tf.

The state feedback unit 280 feeds back the state compensation value Vs to the input torque Tr based on output of the control target 560 so that an apparent transfer function of the control target 560 approaches the transfer function Pn(s) of a nominal model. The apparent transfer function of the control target 560 is, for example, a transfer function of one portion in a case where a portion located inside a feedback loop formed by the model following controller 230 is regarded as the one portion. Specifically, in the present example embodiment, the apparent transfer function of the control target 560 is a transfer function of the entire portion from the subtractor SU2 to output of the control target 560, and is a transfer function of a portion combining the state feedback unit 280 and the control target 560. In the present example embodiment, the state feedback unit 280 feeds back the state compensation value Vs to the input torque Tr after being corrected by the correction torque Tf and before being input to the control target 560.

The state compensation value Vs includes a compensation value to compensate for at least a portion of inertial force generated in the control target 560, viscous force generated in the control target 560, and frictional force generated in the control target 560. More specifically, the state compensation value Vs includes a compensation value to compensate for at least a portion of inertial force generated in the motor 543, viscous force generated in the motor 543, and frictional force generated in the motor 543. In the present example embodiment, the state compensation value Vs is a compensation value including inertial force generated in the motor 543, viscous force generated in the motor 543, and frictional force generated in the motor 543.

The state feedback unit 280 includes an inertia compensator 281, a viscosity compensator 282, and a friction compensator 283. The inertia compensator 281 calculates a compensation value for compensating at least a portion of inertial force generated in the motor 543 based on the steering angle θs. The viscosity compensator 282 calculates a compensation value for compensating at least a portion of viscous force generated in the motor 543 based on the steering angle θs. The friction compensator 283 calculates a compensation value for compensating at least a portion of frictional force generated in the motor 543 based on the steering angle θs. In the present example embodiment, the state compensation value Vs includes a compensation value calculated by the inertia compensator 281, a compensation value calculated by the viscosity compensator 282, and a compensation value calculated by the friction compensator 283. A compensation value calculated by the inertia compensator 281, a compensation value calculated by the viscosity compensator 282, and a compensation value calculated by the friction compensator 283 are output to the adder AD3 and added to the input torque Tr corrected by the correction torque Tf.

Next, control by the model following controller 230 will be described in more detail. The model following controller 230 controls the control target 560 by using an inverse model of a nominal model as an internal model, that is, the inverse nominal model 231. In the present example embodiment, torque ripple depending on the angular velocity ω of the motor 543 or the like can be compensated by a feedback loop formed by the model following controller 230.

The model following controller 230 is structurally similar to a conventional disturbance estimator (disturbance observer), but has different actions and effects. A conventional disturbance estimator estimates a disturbance torque by using an inverse plant model included as an internal model as a model close to the control target 560, and adjusts the disturbance torque in advance to reduce influence of disturbance.

The control by the model following controller 230 according to the present example embodiment utilizes an effect that the transfer function P(s) of the control target 560 is restricted to the transfer function Pn(s) of a nominal model included as an internal model by a feedback loop. For example, if a nominal model is defined such that there is no torque ripple, the transfer function P(s) of the control target 560 is restricted to a characteristic without torque ripple by model following control, and as a result, torque ripple can be reduced by applying torque ripple compensation. Further, by setting a nominal model as a low-inertia model and restricting the control target 560 to the nominal model, the control target 560 can be treated as a low-inertia model. Further, the control target 560 can be treated as a low viscosity model by setting a nominal model as a low viscosity model and restricting the control target 560 to the nominal model. In addition to compensation of torque ripple of the motor 543, for example, lost torque compensation or motor inertia compensation is performed by executing model following control by the model following controller 230. By appropriately setting Jn and Bn in Formulas (2) and (3) above, a desired frequency characteristic can be given to the transfer function P(s) of the control target 560.

When a modeling error between the transfer function P(s) of the control target 560 and the transfer function Pn(s) of a nominal model is Δ(s), the transfer function P(s) of the control target 560 is expressed by Formula (4) below.

Mathematical formula 4

$$P(s) = \frac{1}{J_n s^2 + B_n s}(1 + \Delta(s)) \tag{4}$$

A gain characteristic of the transfer function P(s) of the control target 560 has peaks in two frequency values, for example. The modeling error Δ(s) appears, for example, near a higher frequency peak of the two peaks in the gain characteristic of the control target 560. For this reason, as illustrated in FIG. 6, the reciprocal 1/Δ(s) of the modeling error Δ(s) has a bottom in a relatively high frequency domain. In FIG. 6, the modeling error Δ(s) is indicated by an absolute value. When the modeling error Δ(s) is large, a deviation between the transfer function P(s) of the control target 560 and the transfer function Pn(s) of a nominal model becomes large, and control of the control target 560 using a nominal model by the model following controller 230 becomes unstable. For this reason, in a region where the modeling error Δ(s) is relatively small, the control target 560 can be stably and suitably controlled as the control target 560 is restricted to a nominal model with a gain of the complementary sensitivity function T(s) set to one. A frequency characteristic of the modeling error Δ(s) can be adjusted by adjusting Jn and Bn in the transfer function Pn(s) of a nominal model. A frequency band in which a gain of the complementary sensitivity function T(s) is one can be adjusted by adjusting the first cutoff frequency Cf1 and the second cutoff frequency Cf2. By the above, a gain of the complementary sensitivity function T(s) can be adjusted to be one in a frequency band in which the modeling error Δ(s) is small.

In FIG. 6, 1/Δ(s) is relatively high in a frequency band of the second cutoff frequency Cf2 or less, and rapidly decreases in a frequency band higher than the second cutoff frequency Cf2. Model following control for restricting the control target 560 to a nominal model can be stably performed, for example, in a range where 1/Δ(s) is larger than one, that is, in a range where 1/Δ(s) is larger than 0 dB. For this reason, as illustrated in FIG. 6, by adjusting 1/Δ(s) to be larger than one in a frequency band in which a gain of the complementary sensitivity function T(s) is one, in a case where a gain of the complementary sensitivity function T(s) is one, the control target 560 can be restricted to a nominal model so as to be stably and suitably controlled.

For example, in order to expand a frequency band where the control target 560 can be restricted to a nominal model so as to be stably and suitably controlled, the second cutoff frequency Cf2 is preferably made high within a range in which 1/Δ(s) is not one or less, that is, within a frequency band lower than a frequency at which a curve indicating 1/Δ(s) intersects the horizontal axis in FIG. 6. However, if the second cutoff frequency Cf2 is made too high, a gain of the complementary sensitivity function T(s) remains relatively high even though 1/Δ(s) becomes low in a frequency band higher than the second cutoff frequency Cf2, and control may become unstable. On the other hand, in the present example embodiment, since the order of the second filter 232b that is a low-pass filter is set to three or more, a gain of the complementary sensitivity function T(s) can be steeply lowered in a region where a frequency is higher than the second cutoff frequency Cf2. By the above, even if the second cutoff frequency Cf2 is made relatively high, a gain of the complementary sensitivity function T(s) can be immediately lowered in a frequency band higher than the second cutoff frequency Cf2, so that control of the control target 560 can be prevented from becoming unstable.

Robust stability of the model following controller 230 is guaranteed when a small gain theorem expressed by Formula (5) below is established between the complementary sensitivity function T(s) and the modeling error Δ(s).

Mathematical formula 5

$$|T(j\omega)| < \frac{1}{|\Delta(j\omega)|}, \tag{5}$$

-continued or $$|T(j\omega)\Delta(j\omega)| < 1,$$

$$\forall s = j\omega$$

As described above, in order to perform model following control using a nominal model in the model following controller 230, the complementary sensitivity gain GT of the complementary sensitivity function T(s) only needs to be approximately one, but it is necessary to satisfy Formula (5) above in consideration of robust stability. As understood from this, it is not possible to achieve both the complementary sensitivity gain GT of approximately one in all frequency bands and Formula (5), and it is not possible to achieve both reduction of disturbance and the like by the model following controller 230 and robust stability.

As illustrated in FIG. 6, the complementary sensitivity gain GT of the complementary sensitivity function T(s) is smaller than one also in a low frequency domain FA1 where the frequency f is lower than the first cutoff frequency Cf1. In a region where the complementary sensitivity gain GT of the complementary sensitivity function T(s) is smaller than one, the control target 560 is controlled by controlling the input torque Tr in the reaction force controller 210. As described above, in a high frequency domain FA2 where a frequency is higher than the second cutoff frequency Cf2, the complementary sensitivity gain GT of the complementary sensitivity function T(s) is significantly lowered, and the correction torque Tf from the model following controller 230 is hardly fed back to input of the control target 560. On the other hand, in the low frequency domain FA1, the complementary sensitivity gain GT of the complementary sensitivity function T(s) is set to a certain magnitude, and the correction torque Tf is fed back to input of the control target 560. In the low frequency domain FA1, a compensation value generated in the assist adjustment unit 270 described above is fed back to input of the control target 560 according to the complementary sensitivity gain GT of the complementary sensitivity function T(s).

The control device 100 performs torque control in the reaction force controller 210 with respect to a torque signal having a low frequency lower than the first cutoff frequency Cf1, and performs control such that the angular velocity ω≈0 with respect to disturbance having a high frequency higher than the second cutoff frequency Cf2, so as to realize stabilization of steering to prevent the steering wheel 521 from turning in an unintended manner. In order to achieve this object, the control device 100 lowers a high frequency gain of torque control by using the reaction force controller 210, and restricts the transfer function P(s) of the control target 560 to a characteristic in which a high frequency gain is lowered by using the model following controller 230. The latter processing is performed so that the control target 560 does not react to disturbance when the disturbance is input to the control target 560.

When a transfer function of a portion combining the torque conversion unit 211 and the base assist controller 220 is C2(s) and a disturbance torque Td(s) as a disturbance sensitivity characteristic, that is, a ratio of the correction torque Tf to disturbance input to the control target 560 is m, a transfer characteristic from the disturbance torque Td(s) to a steering torque Th(s) is expressed as Formula (6) below using the complementary sensitivity function T(s), and the complementary sensitivity function T(s) is expressed as Formula (7) below.

19 20

Mathematical formula 6

$$\frac{T_h(s)}{T_d(s)} = -\frac{1-m}{1+C_2(s)P(s)}P(s)K_{tor} = (1-T(s))P(s)K_{tor} \quad (6)$$

Mathematical formula 7

$$T(s) = \frac{C_2(s)P(s)+m}{1+C_2(s)P(s)} \quad (7)$$

Formula (6) above shows that disturbance is completely prevented when the complementary sensitivity function T(s) is one, and at least a portion of disturbance is transmitted when the complementary sensitivity function T(s) is smaller than one. Therefore, disturbance to be transmitted and disturbance to be reduced are divided in frequency domains, and the complementary sensitivity function T(s) is subjected to frequency forming accordingly, so that disturbance sensitivity design for each frequency domain can be performed. In Formulas (6) and (7) above, m is equal to a ratio at which the disturbance torque Td is compensated by the correction torque Tf, and Tf=mTd holds. For example, when the ratio m is 0.5, the disturbance torque Td is compensated by 50% by the correction torque Tf. In the present example embodiment, the ratio m is 0.1 or more and 0.8 or less.

In a case where the transfer function P(s) of the control target 560 is Formula (1) described above, C2(s)=Ktor+Kass is satisfied, and thus a steady gain T(0) of the complementary sensitivity function T(s) at s=0 is expressed by Formula (8) below from Formula (7) above. That is, when a spring constant of the torsion bar 546 is Ktor, an inclination of the self-aligning torque TSAT generated in the tires 529A and 529B of a vehicle with respect to the steering angle θs which is a rotation angle of the output shaft 524b is KSAT, an inclination of a torsion bar torque, that is, the assist torque Tass with respect to the steering torque Th is Kass, a steady gain is T(0), and a ratio of the correction torque Tf to disturbance input to the control target 560, that is, the disturbance torque Td, is m, Formula (8) below is established.

Mathematical formula 8

$$T(0) = \frac{K_{tor}+K_{ass}+mK_{SAT}}{K_{tor}+K_{ass}+K_{SAT}} \quad (8)$$

In a steady state such as a case where the steering wheel 521 is at a center position or near the center position and a case where a traveling speed of a vehicle is high, the assist gain Kass is a value close to zero. Further, the spring constant Ktor of the torsion bar 546 is sufficiently smaller than the self-aligning torque gain KSAT. For this reason, in a steady state such as a case where the steering wheel 521 is at a center position or near the center position and a case where a traveling speed of a vehicle is high, the steady gain T(0) is a value close to the ratio m of the correction torque Tf to the disturbance torque Td(s) from Formula (8) above. The steady gain T(0) of the complementary sensitivity function T(s) expressed by Formula (8) above is 0.1 or more. In the present example embodiment, the steady gain T(0) is 0.3 or more. The steady gain T(0) is, for example, 0.5 or less. The steady gain T(0) is a minimum value of the complementary sensitivity gain GT in the low frequency domain FA1.

Conventionally, for example, the complementary sensitivity function T(s) in the low frequency domain FA1 has had a waveform as indicated by a two-dot chain line illustrated in FIG. 6. In the present example embodiment, by performing model following control by the model following controller 230 described above, the steady gain T(0) of the complementary sensitivity function T(s) can be set as in Formula (8) above, and the complementary sensitivity function T(s) can be formed into a waveform as indicated by a solid line in FIG. 6 with respect to the frequency f.

In the present example embodiment, a low frequency portion TFA1, which is a portion of the low frequency domain FA1 in a waveform of the complementary sensitivity gain GT of the complementary sensitivity function T(s) illustrated in FIG. 6, is formed by the first filter 232a in the model following controller 230, the vehicle stabilization compensator 240, and the adder AD4. More specifically, the frequency component TaM output from the first filter 232a that is a high-pass filter is added to the friction compensation value Vf and the disturbance compensation value Vd output from the vehicle stabilization compensator 240 that functions as a low-pass filter, so that a waveform of the low frequency portion TFA1 is formed. A value at which the frequency f is zero in the low frequency portion TFA1 is a value at which s=0 in the complementary sensitivity function T(s), and is the steady gain T(0) expressed by Formula (8) above.

As illustrated in FIG. 6, the first cutoff frequency Cf1 is higher than a first resonance frequency fyaw. The first resonance frequency fyaw is a resonance frequency of a yaw rate of a vehicle. That is, a lower limit value of a frequency band in which the complementary sensitivity gain GT is one is higher than the first resonance frequency fyaw which is a resonance frequency of a yaw rate of a vehicle. The yaw rate of a vehicle is a parameter indicating a change in a yaw angle which is a rotation angle of the vehicle in a left-right direction. In other words, the yaw rate is an angular velocity when a vehicle rotates in the left-right direction. The first resonance frequency fyaw is, for example, about 1 Hz or more and 1.5 Hz or less.

A second resonance frequency fst illustrated in FIG. 6 is a resonance frequency of the steering mechanism 530. More specifically, the second resonance frequency fst is a resonance frequency of a mode including a spring element that generates the self-aligning torque TSAT and inertia of the entire steering mechanism 530. The second resonance frequency fst is higher than the first resonance frequency fyaw and lower than a lower limit value of a frequency band in which the complementary sensitivity gain GT is one, that is, the first cutoff frequency Cf1. The second resonance frequency fst is, for example, about 3 Hz or more and 5 Hz or less. The complementary sensitivity gain GT at the second resonance frequency fst is higher than the complementary sensitivity gain GT at the first resonance frequency fyaw. The complementary sensitivity gain GT at the second resonance frequency fst is about 0.5 or more and less than about 1. In the present example embodiment, the complementary sensitivity gain GT at the second resonance frequency fst is 0.8 or more.

In the present example embodiment, a high frequency portion TFA2, which is a portion of the high frequency domain FA2 in a waveform of the complementary sensitivity gain GT of the complementary sensitivity function T(s) illustrated in FIG. 6, is formed by the second filter 232b in the model following controller 230.

According to the present example embodiment, the control device 100 includes the model following controller 230 that generates the correction torque Tf for correcting the input torque Tr input to the control target 560 based on output of the control target 560 and a nominal model based on a configuration of the control target 560. The model following controller 230 is configured such that a transfer function of the control target 560 is restricted to a transfer function of a nominal model in a frequency band in which the complementary sensitivity gain GT, which is a gain in a gain characteristic of the complementary sensitivity function T(s) with respect to the modeling error Δ(s) between the control target 560 and the nominal model, is approximately one. The steady gain T(0) of the complementary sensitivity function T(s) is 0.1 or more. A lower limit value of a frequency band in which the complementary sensitivity gain GT is one, that is, the first cutoff frequency Cf1, is higher than the first resonance frequency fyaw, which is a resonance frequency of a yaw rate of a vehicle. The second resonance frequency fst, which is a resonance frequency of the steering mechanism 530, is higher than the first resonance frequency fyaw and lower than a lower limit value of a frequency band in which the complementary sensitivity gain GT is one, that is, the first cutoff frequency Cf1. The complementary sensitivity gain GT at the second resonance frequency fst is higher than the complementary sensitivity gain GT at the first resonance frequency fyaw, and is about 0.5 or more and less than about 1.

For example, a conventional disturbance estimator has included a model close to the control target 560 as an internal model, and compensated disturbance generated in the control target 560. However, it is difficult to include completely the same model as the control target 560 as an internal model, and the modeling error Δ(s) inevitably occurs. For this reason, in the conventional disturbance estimator, in order to prevent control from becoming unstable, a gain in a gain characteristic of the complementary sensitivity function T(s) has been set to a value smaller than one in all frequency bands. Further, in the conventional disturbance estimator, since an internal model has been merely made close to an actual model of the control target 560, although disturbance applied to the control target 560 from the outside has been able to be estimated, torque ripple or the like generated in the control target 560 itself has not been able to be removed.

On the other hand, in the present example embodiment, a nominal model included in the control device 100 as an internal model is set as a model that is ideal as the control target 560 instead of a model that reproduces an actual model of the control target 560, and the complementary sensitivity gain GT of the complementary sensitivity function T(s) is set to be approximately one in a region where the modeling error Δ(s) is small. By the above, by suitably setting a nominal model, not only disturbance actually applied to the control target 560 from the outside but also torque ripple internally generated in the control target 560 can be removed. By the above, it is possible to remove disturbance and the like caused by the fact that the control target 560 is a two-inertia system, and controllability of the control target 560 configured as a two-inertia system can be improved. Further, since the control device 100 can suitably control the control target 560, a steering feeling felt by a steering operator can be improved.

Further, in the present example embodiment, since the steady gain T(0) of the complementary sensitivity function T(s) is 0.1 or more, reaction force received from the tires 529A and 529B, that is, the self-aligning torque TSAT, can be compensated to some extent by model following control also in the low frequency domain FA1, unlike the conventional case indicated by the two-dot chain line in FIG. 6. Further, the complementary sensitivity gain GT at the second resonance frequency fst that is lower than a lower limit value of a frequency band in which the complementary sensitivity gain GT is one and higher than the first resonance frequency fyaw is higher than the complementary sensitivity gain GT at the first resonance frequency fyaw, and is 0.5 or more. For this reason, in a region where the frequency f is relatively high in the low frequency domain FA1, the self-aligning torque TSAT of the tires 529A and 529B can be further compensated. By the above, it is possible to suitably reduce reaction force that a steering operator receives from the steering wheel 521. Further, since the complementary sensitivity gain GT at the second resonance frequency fst is less than one, the self-aligning torque TSAT of the tires 529A and 529B is not compensated 100% even in a region where the frequency f is relatively high in the low frequency domain FA1, and a portion of the self-aligning torque TSAT is transmitted to a steering operator. By the above, appropriate reaction force can be given to a steering operator via the steering wheel 521. Further, it is possible to apply other control such as active return control and return speed control (convergence control) while compensating disturbance such as the self-aligning torque TSAT by model following control, and it is possible to more suitably adjust reaction force received by a steering operator from the steering wheel 521. As described above, according to the present example embodiment, a steering feeling felt by a steering operator can be further improved.

For example, in a case where model following control is not performed, in order to stabilize traveling of a vehicle, it is conceivable to apply return speed control (convergence control) that gives damping to the steering wheel 521 strongly to some extent. However, in this case, since force to apply brake to steering of the steering wheel 521 acts strongly, a steering feeling felt by a steering operator deteriorates. On the other hand, for example, it is conceivable that return speed control is applied only when a steering operator is not operating the steering wheel 521, and return speed control is not applied when a steering operator is operating the steering wheel 521. However, in this case, a control amount of the return speed control significantly differs between when a steering operator operates the steering wheel 521 and when a steering operator does not operate the steering wheel 521. For this reason, for example, when a steering operator turns back the steering wheel 521, a control amount of the return speed control significantly changes, and a steering operator has a sense of discomfort.

In the present example embodiment, by adjusting the complementary sensitivity gain GT of the complementary sensitivity function T(s) to the above-described value, a portion of the self-aligning torque TSAT, which is reaction force received from the tires 529A and 529B, can be compensated. Therefore, it is possible to stabilize traveling of a vehicle while weakening return speed control. By the above, it is possible to reduce deterioration of a steering feeling felt by a steering operator while reducing discomfort given to the steering operator.

Further, a rotation angular velocity of the steering wheel 521, that is, the steerage angular velocity ωh when an angle of the steering wheel 521 starts to return to a predetermined reference angle by active return control and return speed control is determined by magnitude of the self-aligning torque TSAT transmitted to the steering wheel 521. For this reason, in a case where model following control is not performed, the self-aligning torque TSAT transmitted to the steering wheel 521 becomes large, and the steerage angular velocity ωh when an angle of the steering wheel 521 starts to return to a reference angle becomes large. In this case, a difference in change of the steerage angular velocity ωh from when an angle of the steering wheel 521 starts to return to a reference angle to when the angle of the steering wheel 521 finishes returning to the reference angle becomes large, and movement of the steering wheel 521 when an angle of the steering wheel 521 returns to the reference angle is less likely to be smooth. Further, in a case where model following control is not performed, beat vibration occurs due to resonance occurring at each of the first resonance frequency fyaw and the second resonance frequency fst, the steerage angular velocity ωh periodically changes, and rattling occurs in movement of the steering wheel 521 when an angle of the steering wheel 521 returns to a reference angle. By the above, movement of the steering wheel 521 is less likely to become smoother.

In view of the above problem, in the present example embodiment, since a portion of the self-aligning torque TSAT can be compensated by model following control, the self-aligning torque TSAT transmitted to the steering wheel 521 can be reduced. By the above, it is possible to reduce the steerage angular velocity ωh when an angle of the steering wheel 521 starts to return to a reference angle. By the above, it is possible to reduce a difference in change in the steerage angular velocity ωh from when an angle of the steering wheel 521 starts to return to a reference angle to when the angle of the steering wheel 521 finishes returning to the reference angle. Therefore, it is easy to smooth movement of the steering wheel 521 when an angle of the steering wheel 521 returns to a reference angle. Further, by setting the complementary sensitivity gain GT at the second resonance frequency fst to 0.5 or more, it is possible to compensate the self-aligning torque TSAT relatively much at the second resonance frequency fst. For this reason, resonance can be prevented from occurring at the second resonance frequency fst, and the above-described beat vibration can be prevented from occurring. Therefore, rattling can be prevented from occurring in movement of the steering wheel 521 when an angle of the steering wheel 521 returns to a reference angle, and unevenness can be prevented from occurring in a rotation angular velocity of the steering wheel 521, that is, the steerage angular velocity ωh. For this reason, it is easy to further smooth movement of the steering wheel 521 when an angle of the steering wheel 521 returns to a reference angle. Since movement of the steering wheel 521 can be smoothed, it is possible to give a luxurious feeling to movement of the steering wheel 521 when an angle of the steering wheel 521 returns to a reference angle.

Further, in a case where there is unevenness on a road surface on which a vehicle travels, the tires 529A and 529B receive force from the unevenness, and the steering wheel 521 is likely to turn in a manner unintended by a steering operator. The frequency f of the steerage angle θh in such a case is about 5 Hz or more and 10 Hz or less, and is about the same as the second resonance frequency fst or larger than the second resonance frequency fst. As described above, in model following control of the present example embodiment, the complementary sensitivity gain GT at the second resonance frequency fst is 0.5 or more which is relatively large, and the complementary sensitivity gain GT is one at the first cutoff frequency Cf1 higher than the second resonance frequency fst. Therefore, by adjusting the complementary sensitivity function T(s) to the numerical range as described above, in a case where a vehicle travels on a road surface having unevenness, force received by the tires 529A and 529B from the unevenness can be suitably compensated by model following control. For this reason, even in a case where a vehicle travels on a road surface having unevenness, it is possible to prevent the steering wheel 521 from turning in a manner unintended by a steering operator. Therefore, a steering feeling felt by a steering operator can be further improved.

Further, a road surface on which a vehicle travels may have a slight inclination in order to improve drainage or the like. In this case, when a vehicle is to travel straight, a steering operator needs to slightly rotate the steering wheel 521. For this reason, in a case where model following control is not performed, there has been a case where burden is placed on an arm of a steering operator. On the other hand, in the present example embodiment, since the steady gain T(0) is 0.1 or more, the self-aligning torque TSAT received from the tires 529A and 529B can be compensated to some extent by model following control even in the low frequency domain FA1 in which the steering wheel 521 is not operated or not operated much. By the above, even in a case where the steering wheel 521 is slightly rotated in a case where a vehicle is caused to travel straight on a road surface with a slight inclination, it is possible to reduce reaction force that a steering operator receives from the steering wheel 521. Therefore, it is possible to reduce burden placed on an arm of a steering operator.

Further, according to the present example embodiment, the control device 100 includes the base assist controller 220 that generates the assist torque Tass that compensates for at least a portion of the self-aligning torque TSAT generated in the tires 529A and 529B of a vehicle based on a torsion bar torque generated in the torsion bar 546, that is, the steering torque Th. When a spring constant of the torsion bar 546 is Ktor, an inclination of the self-aligning torque TSAT generated in the tires 529A and 529B of a vehicle with respect to the steering angle θs which is a rotation angle of the output shaft 524b is KSAT, an inclination of the assist torque Tass with respect to a torsion bar torque, that is, the steering torque Th, is Kass, the self-aligning torque is TSAT, an assist torque is Tass, a steady gain is T(0), and Tass=mTSAT (where 0<m<1) holds, Formula (9) above holds. As the steady gain T(0) is expressed by Formula (9), the complementary sensitivity gain GT in the low frequency domain FA1 can be suitably and significantly adjusted as described above. By the above, the above-described effect can be further obtained, and a steering feeling felt by a steering operator can be further improved. In order to more suitably obtain the above-described effect, m is preferably 0.1 or more and 0.8 or less, and more preferably 0.3 or more and 0.8 or less.

Furthermore, according to the present example embodiment, the control device 100 can execute control for returning an angle of the steering wheel 521 to a predetermined reference angle, that is, active return control and return speed control. As described above, by adjusting the complementary sensitivity gain GT of the complementary sensitivity function T(s) while using model following control, it is possible to smooth movement of the steering wheel 521 when an angle of the steering wheel 521 returns to a reference angle while preventing lowering in a steering feeling felt by a steering operator. Therefore, an effect obtained by adjusting the complementary sensitivity gain GT of the complementary sensitivity function T(s) within the numerical range as described above is more usefully obtained in a case where control of returning an angle of the steering wheel 521 to a reference angle is performed.

Further, according to the present example embodiment, the steady gain T(0) is 0.3 or more, and the complementary sensitivity gain GT at the second resonance frequency fst is 0.8 or more. For this reason, the complementary sensitivity gain GT in the low frequency domain FA1 can be suitably made large. By the above, the above-described effect can be more usefully obtained, and a steering feeling felt by a steering operator can be more suitably improved.

Further, according to the present example embodiment, a lower limit value of a frequency band in which the complementary sensitivity gain GT is one, that is, the first cutoff frequency Cf1, is lower than 10 Hz. For this reason, the complementary sensitivity gain GT can be set to one or a value close to one in a range of 5 Hz or more and 10 Hz or less, which is likely to be the frequency f when the tires 529A and 529B receive force from unevenness of a road surface. By the above, it is possible to more suitably prevent the steering wheel 521 from turning in a manner unintended by a steering operator when a vehicle travels on a road surface having unevenness.

Further, according to the present example embodiment, the complementary sensitivity function T(s) is a function including a transfer function of a low-pass filter and a transfer function of a high-pass filter. In the present example embodiment, a transfer function of a low-pass filter includes a transfer function of the second filter 232b and a transfer function of the assist adjustment unit 270 that functions as a low-pass filter. A transfer function of a high-pass filter includes a transfer function of the first filter 232a. For this reason, the complementary sensitivity gain GT of the complementary sensitivity function T(s) can be suitably adjusted to the above-described numerical range in each frequency domain.

The present inventors has confirmed an effect obtained by applying model following control by the control device 100 of the above-described example embodiment by performing measurement using an actual vehicle. In the measurement using an actual vehicle, for each of the steerage angle θh and the steerage angular velocity ωh of the steering wheel 521 when an angle of the steering wheel 521 returns to a predetermined reference angle, a case where model following control is not applied and a case where the model following control is applied were compared.

Figure 8:
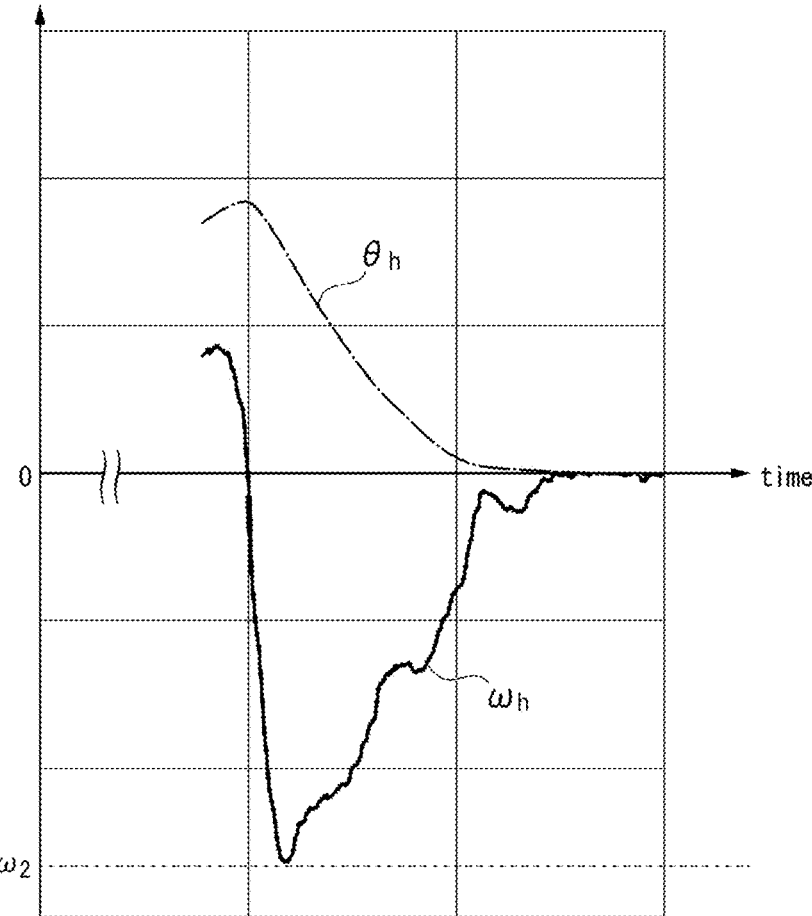
FIG. 8 is a graph illustrating an example of a measurement result of a steerage angle and a rotation angular velocity in a case where model following control is not applied.
Figure 9:
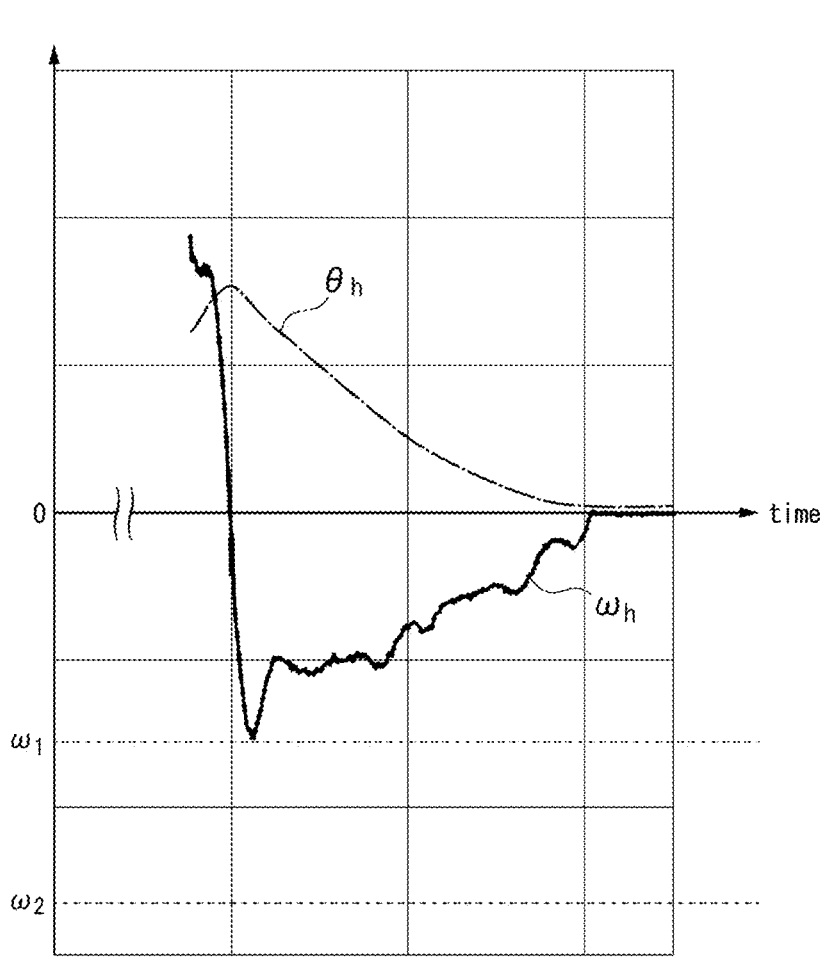
FIG. 9 is a graph illustrating an example of a measurement result of a steerage angle and a rotation angular velocity in a case where the model following control is applied.

FIG. 8 illustrates a measurement result of the steerage angle θh [deg] and the steerage angular velocity ωh [deg/s] in a case where model following control is not applied. FIG. 9 illustrates a measurement result of the steerage angle θh [deg] and the steerage angular velocity ωh [deg/s] in a case where model following control is applied. In the graphs of FIGS. 8 and 9, the horizontal axis represents time, and the vertical axis represents magnitude of each parameter of the steerage angle θh and the steerage angular velocity ωh. In each of the graphs of FIGS. 8 and 9, the steerage angular velocity ωh indicates, as a negative value, a speed in a direction in which an angle of the steering wheel 521 returns to a predetermined reference angle. In the graphs of FIGS. 8 and 9, the steerage angle θh is indicated by a one-dot chain line, and the steerage angular velocity ωh is indicated by a solid line.

As illustrated in FIG. 8, in a case where model following control is not applied, when an angle of the steering wheel 521 starts to return to a predetermined reference angle, an absolute value of the steerage angular velocity ωh increases, and an angle of the steering wheel 521 returns to the reference angle while the steerage angular velocity ωh periodically changes with a relatively large amplitude. When the steerage angular velocity ωh of the steering wheel 521 changes in this manner, movement of the steering wheel 521 appears rattling. Note that, in FIGS. 8 and 9, the predetermined reference angle is 0°.

On the other hand, as illustrated in FIG. 9, in a case where model following control is applied, it is confirmed that an absolute value of the steerage angular velocity ωh is smaller than that in FIG. 8 when an angle of the steering wheel 521 starts to return to the predetermined reference angle. Specifically, when an angle of the steering wheel 521 starts to return to the reference angle, an absolute value of the steerage angular velocity ωh in FIG. 8 is ω2, but an absolute value of the steerage angular velocity ωh in FIG. 9 is ω1 which is smaller than ω2. Further, although an absolute value of the steerage angular velocity ωh in FIG. 9 slightly vibrates, the amplitude is sufficiently smaller than the steerage angular velocity ωh in FIG. 8. For this reason, when an angle of the steering wheel 521 returns to the reference angle, movement of the steering wheel 521 is prevented from appearing rattling. By the above, it has been confirmed that movement of the steering wheel 521 can be smoothed when an angle of the steering wheel 521 returns to a predetermined reference angle by performing model following control as in the above-described example embodiment.

Figure 10:
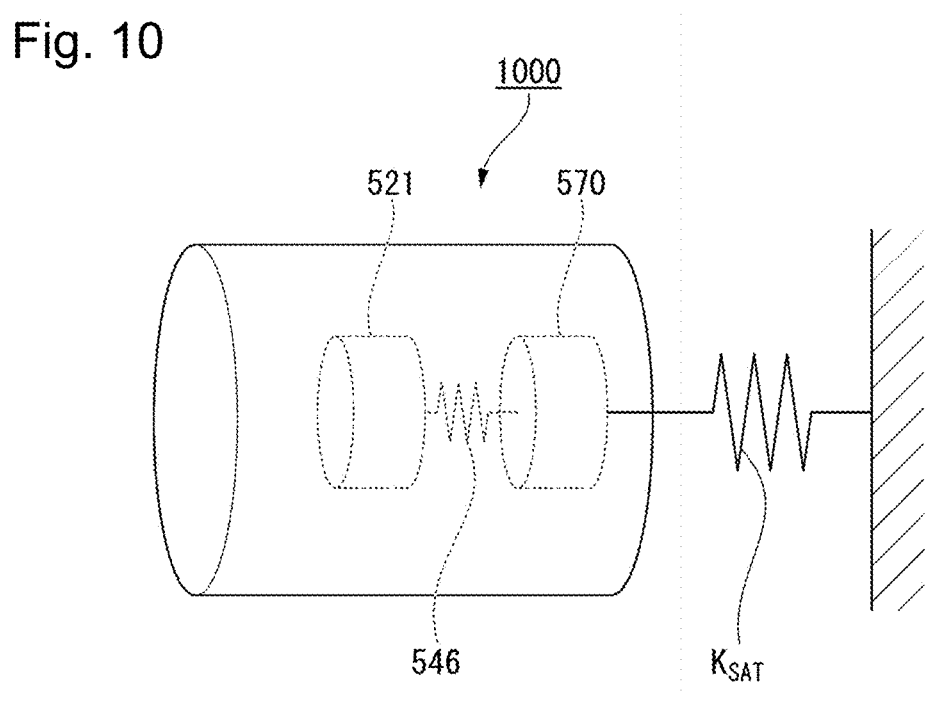

Note that the electric power steering device 1000 is also represented as a simplified model as illustrated in FIG. 10. In FIG. 10, a model of the control target 560 of the electric power steering device 1000 is regarded as a one-inertia system. A turning side mechanism unit 570 illustrated in FIG. 10 is a portion from the output shaft 524b to the tires 529A and 529B in the steering mechanism unit 520. In a case where the electric power steering device 1000 is regarded as a model of a one-inertia system as illustrated in FIG. 10, the transfer function P(s) of the control target 560 is expressed by, for example, Formula (10) below.

Mathematical formula 9

$$P(s) = \frac{J_h s}{(J_h + J_{STG})s + B_{STG}} \quad (9)$$

where s is a Laplace variable, Jh is a parameter representing the moment of inertia of the steering wheel 521, JSTG is a parameter representing the moment of inertia of the turning side mechanism unit 570, and BSTG is a parameter representing a viscous friction coefficient of the turning side mechanism unit 570.

The transfer function P(s) of the control target 560, that is, a plant characteristic in model following control is not limited to the above-described example, and may be expressed in any manner. The transfer function P(s) of the control target 560 may be expressed as a two-inertia system, or may be expressed by a formula derived by high-order approximation.

Further, in the present example embodiment, the low frequency portion TFA1 which is a portion of the low frequency domain FA1 in a waveform of the complementary sensitivity gain GT of the complementary sensitivity function T(s) may be formed by a phase advance compensator. Specifically, the first filter 232a may be a phase advance compensator. In this case, the complementary sensitivity function T(s) is a function including a transfer function of the second filter 232b as a low-pass filter and a transfer function of a phase advance compensator. Even in this case, the complementary sensitivity gain GT of the complementary sensitivity function T(s) can be suitably adjusted to the above-described numerical range, and a waveform of the complementary sensitivity gain GT as illustrated in FIG. 6 can be realized.

Figure 11:
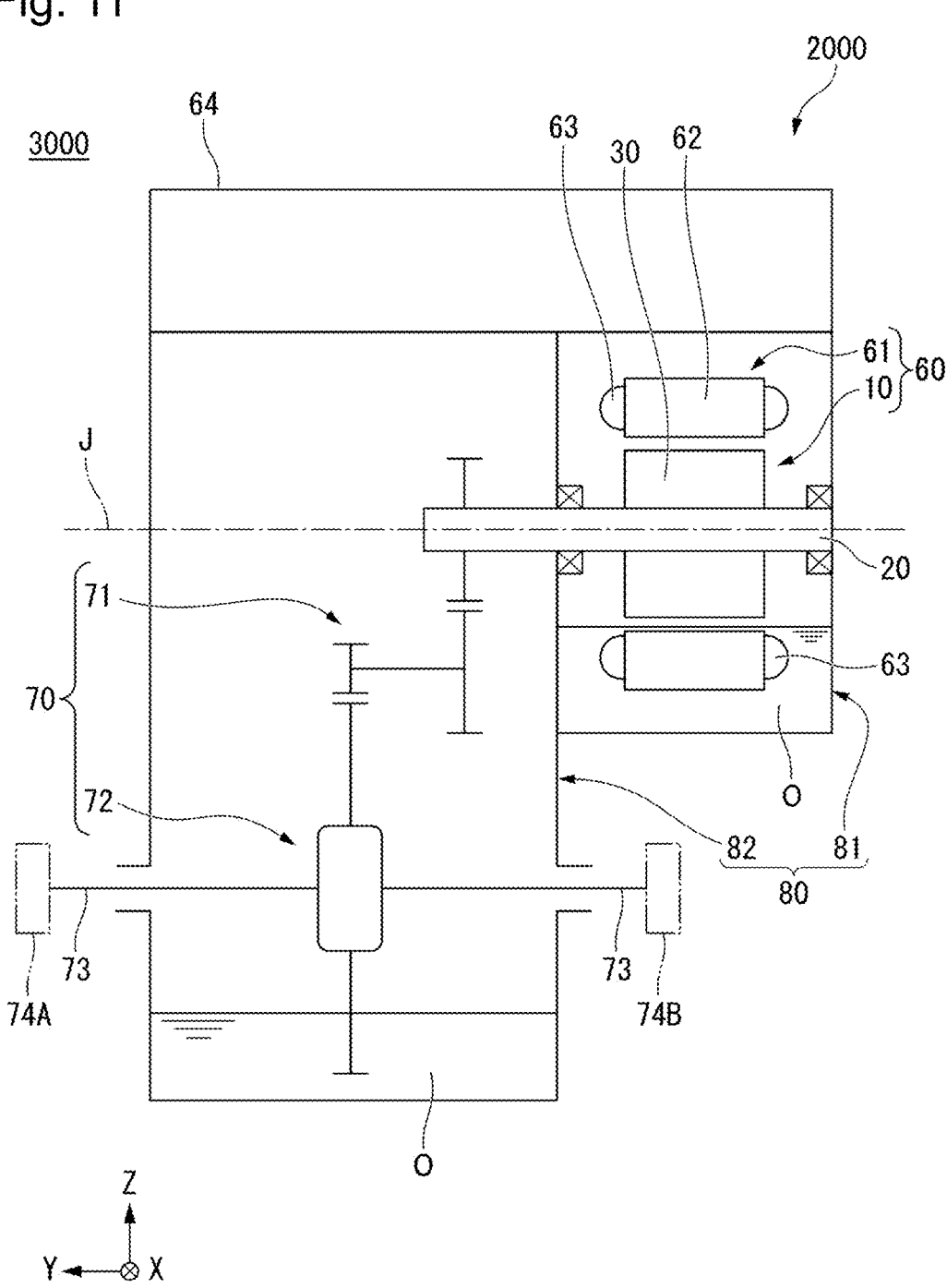
FIG. 11 is a diagram schematically illustrating a drive device according to an example embodiment of the present disclosure.

The control device 100 described in the example embodiment of the electric power steering described above can also be applied to a drive device 2000 illustrated in FIG. 11. The drive device 2000 illustrated in FIG. 11 is a drive device that is mounted on a vehicle and rotates a drive shaft 73 of the vehicle. A vehicle mounted with the drive device 2000 is a vehicle with a motor as a power source, such as a hybrid vehicle (HEV), a plug-in hybrid vehicle (PHV), or an electric vehicle (EV).

In FIG. 11, an XYZ coordinate system is illustrated as a three-dimensional orthogonal coordinate system. In the XYZ coordinate system, a Z-axis direction is an up-down direction. A side to which an arrow of the Z axis is directed (+Z side) is an upper side, and a side opposite to the side to which the arrow of the Z axis is directed (−Z side) is a lower side. An X-axis direction is a direction orthogonal to the Z-axis direction and is a front-rear direction of a vehicle on which the drive device 2000 is mounted. In an example embodiment below, a side (+X side) to which an arrow in the X axis is directed is a front side in a vehicle, and a side (−X side) opposite to the side to which the arrow in the X axis is directed is a rear side in the vehicle. A Y-axis direction corresponds to a left-right direction of a vehicle, that is, a width direction of the vehicle, and is a direction orthogonal to both the X-axis direction and the Z-axis direction. In the present example embodiment, a side (+Y side) to which an arrow in the Y axis is directed is a left side in a vehicle, and a side (−Y side) opposite to the side to which the arrow in the Y axis is directed is a right side in the vehicle.

Note that a positional relationship in the front-rear direction is not limited to a positional relationship in the present example embodiment, and the +X side may be the rear side of a vehicle, and the −X side may be the front side of a vehicle. In this case, the +Y side is the right side of a vehicle, and the −Y side is the left side of a vehicle. In the present description, a "parallel direction" includes a substantially parallel direction, and an "orthogonal direction" includes a substantially orthogonal direction.

A central axis J illustrated in FIG. 11 is a virtual axis extending in a direction intersecting the up-down direction. More specifically, the central axis J extends in the Y-axis direction orthogonal to the up-down direction, that is, in the left-right direction of a vehicle. In description below, unless otherwise noted, a direction parallel to the central axis J is simply referred to as the "axial direction", "axial", or "axially", a radial direction around the central axis J is simply referred to as the "radial direction", "radial", or "radially", and a circumferential direction around the central axis J is simply referred to as the "circumferential direction", "circumferential", or "circumferentially". In description below, the left side (+Y side) in the axial direction is referred to as "one axial side", and the right side (−Y side) in the axial direction is referred to as "another axial side". The up-down direction is, for example, a vertical direction, and the front-rear direction and the left-right direction (axial direction) are, for example, a horizontal direction orthogonal to the vertical direction.

As illustrated in FIG. 11, the drive device 2000 includes a motor 60, a gear mechanism 70 connected to the motor 60, a housing 80 that accommodates the motor 60 and the gear mechanism 70 in the inside, and a control device 64 to control the motor 60. The housing 80 accommodates the motor 60 and the gear mechanism 70 in the inside. The housing 80 includes a motor housing 81 that accommodates the motor 60 in the inside and a gear housing 82 that accommodates the gear mechanism 70 in the inside. In the present example embodiment, oil 0 is accommodated inside the motor housing 81 and inside the gear housing 82.

The motor 60 includes a rotor 10 rotatable around the central axis J and a stator 61 facing the rotor 10 with a gap interposed between them. In the present example embodiment, the stator 61 is located on a radially outside the rotor 10. The stator 61 includes a stator core 62 and a plurality of coils 63 attached to the stator core 62. The rotor 10 includes a shaft 20 and a rotor core 30 fixed to an outer peripheral surface of the shaft 20. Although not illustrated, a magnet is held in the rotor core 30. The shaft 20 extends in the axial direction around the central axis J. An end portion on the left side (+Y side) of the shaft 20 protrudes into the gear housing 82. An end portion on the left side of the shaft 20 is connected to the gear mechanism 70.

The gear mechanism 70 transmits rotation of the motor 60 to the drive shaft 73 of a vehicle. The gear mechanism 70 includes a deceleration device 71 connected to the shaft 20 of the motor 60 and a differential device 72 connected to the deceleration device 71. A drive shaft 73 extending in the axial direction (Y-axis direction) is connected to the differential device 72. A pair of the drive shafts 73 are provided. A pair of tires 74A and 74B is connected to a pair of the drive shafts 73.

When rotation of the rotor 10 in the motor 60 is transmitted to the differential device 72 via the deceleration device 71, a pair of the drive shafts 73 coupled to the differential device 72 rotates. In this manner, the drive device 2000 rotates the drive shaft 73 to which the tires 74A and 74B of a vehicle are coupled. Rotation of a pair of the drive shafts 73 rotates a pair of the tires 74A and 74B, and a vehicle travels.

In the present example embodiment, a control target controlled by the control device 64 includes the motor 60. The control device 64 controls the drive device 2000 by supplying electric power to the motor 60. The control device 64 also controls a pair of the drive shafts 73 connected to the drive device 2000 and a pair of the tires 74A and 74B connected to a pair of the drive shafts 73 by driving the drive device 2000. In the present example embodiment, a control target of the control device 64 is a drive mechanism 3000 including the tires 74A and 74B, the drive shaft 73, and the drive device 2000.

The drive device 2000 is configured as a two-inertia system similarly to the electric power steering device 1000 described above. The electric power steering device 1000 described above is configured as a two-inertia system in which the steering wheel 521 and the motor 543 are connected via the torsion bar 546 which is a spring element. The drive device 2000 of the present example embodiment is configured as a two-inertia system in which the tires 74A and 74B and the motor 60 are connected via the drive shaft 73 that can be regarded as a spring element. Also in the drive device 2000, which is configured as a two-inertia system, a problem derived from a two-inertia system, such as that when a torque of the motor 60 is increased, the drive shaft 73 is twisted, and acceleration of the tires 74A and 74B vibrates when the twist is eliminated by rotation of the tires 74A and 74B, occurs. The problem can be solved by configuring the control device 64 of the present example embodiment in the same manner as the control device 100 in the electric power steering device 1000 described above to perform model following control. Further, by adjusting the complementary sensitivity gain GT of the complementary sensitivity function T(s) similarly to the control device 100 described above, the same effect as the effect described in the example embodiment of the electric power steering device 1000 described above can be obtained also in the drive device 2000.

As an example, in the control device 64, it is conceivable to perform control similar to that of the control device 100 by replacing the steerage angle θh in the example embodiment of the electric power steering device 1000 with a rotation angle of the tires 74A and 74B around the axis of the drive shaft 73 and replacing the steering angle θs with a rotation angle around the central axis J of the shaft 20. A rotation angle of the tires 74A and 74B around the axis of the drive shaft 73 may be detected by an angle sensor (not illustrated) or may be detected by a rotation speed sensor (not illustrated).

In the present example embodiment, a first resonance frequency is a resonance frequency of the drive device 2000, and a lower limit value of a frequency band in which the complementary sensitivity gain GT of the complementary sensitivity function T(s) is one is higher than the first resonance frequency. In the present example embodiment, a second resonance frequency is a resonance frequency of the drive mechanism 3000 including the tires 74A and 74B, the drive shaft 73, and the drive device 2000. The second resonance frequency is higher than the first resonance frequency of the present example embodiment described above and lower than a lower limit value of a frequency band in which the complementary sensitivity gain GT is one. Also in the present example embodiment, the complementary sensitivity gain GT at the second resonance frequency is higher than the complementary sensitivity gain GT at the first resonance frequency, and is about 0.5 or more and less than about 1. The complementary sensitivity gain GT of the complementary sensitivity function T(s) and the steady gain T(0) of the complementary sensitivity function T(s) can be similar to those in the example embodiment of the electric power steering device 1000 described above.

The present disclosure is not limited to the above-described example embodiment, and other configurations and other methods can be employed within the scope of the technical idea of the present disclosure. A control target controlled by a control device is not particularly limited as long as the control target includes a motor. In the above-described example embodiment, an example in which the control device 100 performs control using the steerage angle θh and the steering angle θs is described, but the present disclosure is not limited to this. The control device 100 may perform control using the steering torque Th and an angular velocity of the steering angle θs. In this case, a value input to the controller 200a described above is the steering torque Th instead of the steerage angle θh, and output from the control target 560 is an angular velocity of the steering angle θs instead of the steering angle θs. The control device 100 may perform the control as in the above-described example embodiment by using any other parameter.

Note that the present technique can have a configuration below.

(1) A control device to control, as a control target, a portion in a steering mechanism that includes an input shaft to which a steering wheel steered by a steering operator is coupled, an output shaft coupled to the input shaft via a torsion bar, and a motor coupled to the output shaft and that is mounted on a vehicle, the portion including at least the motor, the control device including a model following controller configured or programmed to generate a correction torque to correct an input torque input to the control target based on output of the control target and a nominal model based on a configuration of the control target. The model following controller is configured or programmed such that a transfer function of the control target is restricted to a transfer function of the nominal model in a frequency band in which a complementary sensitivity gain, which is a gain in a gain characteristic of a complementary sensitivity function with respect to a modeling error between the control target and the nominal model, is approximately one, a steady gain of the complementary sensitivity function is about 0.1 or more, a lower limit value of a frequency band in which the complementary sensitivity gain is about one is higher than a first resonance frequency that is a resonance frequency of a yaw rate of the vehicle, a second resonance frequency that is a resonance frequency of the steering mechanism is higher than the first resonance frequency and lower than a lower limit value of a frequency band in which the complementary sensitivity gain is about one, and the complementary sensitivity gain at the second resonance frequency is higher than the complementary sensitivity gain at the first resonance frequency, and is about 0.5 or more and less than about 1.

(2) The control device according to (1), further including a base assist controller configured or programmed to generate an assist torque to compensate for at least a portion of a self-aligning torque generated in a tire of the vehicle based on a torsion bar torque generated in the torsion bar. When a spring constant of the torsion bar is Ktor, an inclination of a self-aligning torque generated in a tire of the vehicle with respect to a steering angle that is a rotation angle of the output shaft is KSAT, an inclination of the assist torque with respect to the torsion bar torque is Kass, the steady gain is T(0), and a ratio of the correction torque to disturbance input to the control target is m, the following formula is satisfied:

$$T(0) = \frac{K_{tor} + K_{ass} + mK_{SAT}}{K_{tor} + K_{ass} + K_{SAT}}$$

(3) The control device according to (1) or (2), in which control of returning an angle of the steering wheel to a predetermined reference angle is executable.

(4) A control device to control a control target including a motor in a drive device to rotate a drive shaft to which a tire of a vehicle is coupled, the control device including a model following controller configured or programmed to generate a correction torque to correct an input torque input to the control target based on output of the control target and a nominal model based on a configuration of the control target. The model following controller is configured or programmed such that a transfer function of the control target is restricted to a transfer function of the nominal model in a frequency band in which a complementary sensitivity gain, which is a gain in a gain characteristic of a complementary sensitivity function with respect to a modeling error between the control target and the nominal model, is approximately one, a steady gain of the complementary sensitivity function is about 0.1 or more, a lower limit value of a frequency band in which the complementary sensitivity gain is about one is higher than a first resonance frequency that is a resonance frequency of the drive device, a second resonance frequency that is a resonance frequency of a drive mechanism including the tire, the drive shaft, and the drive device is higher than the first resonance frequency and lower than a lower limit value of a frequency band in which the complementary sensitivity gain is about one, and the complementary sensitivity gain at the second resonance frequency is higher than the complementary sensitivity gain at the first resonance frequency, and is about 0.5 or more and less than about 1.

(5) The control device according to any one of (1) to (4), in which the steady gain is about 0.3 or more, and the complementary sensitivity gain at the second resonance frequency is about 0.8 or more.

(6) The control device according to any one of (1) to (5), in which a lower limit value of a frequency band in which the complementary sensitivity gain is about one is lower than about 10 Hz.

(7) The control device according to any one of (1) to (6), in which the complementary sensitivity function is a function including a transfer function of a low-pass filter and a transfer function of a phase advance compensator.

(8) The control device according to any one of (1) to (7), in which the complementary sensitivity function is a function including a transfer function of a low-pass filter and a transfer function of a high-pass filter.

(9) An electric power steering device including: the control device according to any one of (1) to (3); and the steering mechanism.

(10) A drive device including: the control device according to (4); the motor; and a gear mechanism connected to the motor.

The configurations and methods described above in the present description can be appropriately combined within a range consistent with each other.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device to control, as a control target, a portion in a steering mechanism that includes an input shaft to which a steering wheel steered by a steering operator is coupled, an output shaft coupled to the input shaft via a torsion bar, and a motor coupled to the output shaft and that is mounted on a vehicle, the portion including at least the motor, the control device comprising:

a model following controller configured or programmed to generate a correction torque to correct an input torque input to the control target based on output of the control target and a nominal model based on a configuration of the control target; wherein the model following controller is configured or programmed such that a transfer function of the control target is restricted to a transfer function of the nominal model in a frequency band in which a complementary sensitivity gain, which is a gain in a gain characteristic of a complementary sensitivity function with respect to a modeling error between the control target and the nominal model, is approximately one;

a steady gain of the complementary sensitivity function is about 0.1 or more;

a lower limit value of a frequency band in which the complementary sensitivity gain is about one is higher than a first resonance frequency that is a resonance frequency of a yaw rate of the vehicle;

a second resonance frequency that is a resonance frequency of the steering mechanism is higher than the first resonance frequency and lower than a lower limit value of a frequency band in which the complementary sensitivity gain is about one;

the complementary sensitivity gain at the second resonance frequency is higher than the complementary sensitivity gain at the first resonance frequency, and is about 0.5 or more and less than about 1;

the control target is defined by a two-inertia system which includes the steering mechanism; and the steering mechanism is driven with the corrected input torque generated by the model following controller.

2. The control device according to claim 1, further comprising:

a base assist controller configured or programmed to generate an assist torque to compensate for at least a portion of a self-aligning torque generated in a tire of the vehicle based on a torsion bar torque generated in the torsion bar; wherein when a spring constant of the torsion bar is Ktor, an inclination of a self-aligning torque generated in a tire of the vehicle with respect to a steering angle that is a rotation angle of the output shaft is KSAT, an inclination of the assist torque with respect to the torsion bar torque is Kass, the steady gain is T(0), and a ratio of the correction torque to disturbance input to the control target is m, a following formula is satisfied:

$$T(0) = \frac{K_{tor} + K_{ass} + mK_{SAT}}{K_{tor} + K_{ass} + K_{SAT}}.$$

3. The control device according to claim 1, wherein control of returning an angle of the steering wheel to a predetermined reference angle is executable by using the control device.

4. The control device according to claim 1, wherein the steady gain is about 0.3 or more; and the complementary sensitivity gain at the second resonance frequency is about 0.8 or more.

5. The control device according to claim 1, wherein a lower limit value of a frequency band in which the complementary sensitivity gain is about one is lower than about 10 Hz.

6. The control device according to claim 1, wherein the complementary sensitivity function is a function including a transfer function of a low-pass filter and a transfer function of a phase advance compensator.

7. The control device according to claim 1, wherein the complementary sensitivity function is a function including a transfer function of a low-pass filter and a transfer function of a high-pass filter.

8. An electric power steering device comprising: the control device according to claim 1; and the steering mechanism.

9. A control device to control a control target including a motor in a drive device to rotate a drive shaft to which a tire of a vehicle is coupled, the control device comprising:

a model following controller configured or programmed to generate a correction torque to correct an input torque input to the control target based on output of the control target and a nominal model based on a configuration of the control target; wherein the model following controller is configured or programmed such that a transfer function of the control target is restricted to a transfer function of the nominal model in a frequency band in which a complementary sensitivity gain, which is a gain in a gain characteristic of a complementary sensitivity function with respect to a modeling error between the control target and the nominal model, is approximately one;

a steady gain of the complementary sensitivity function is about 0.1 or more;

a lower limit value of a frequency band in which the complementary sensitivity gain is about one is higher than a first resonance frequency that is a resonance frequency of the drive device;

a second resonance frequency that is a resonance frequency of a drive mechanism including the tire, the drive shaft, and the drive device is higher than the first resonance frequency and lower than a lower limit value of a frequency band in which the complementary sensitivity gain is about one;

the complementary sensitivity gain at the second resonance frequency is higher than the complementary sensitivity gain at the first resonance frequency, and is about 0.5 or more and less than about 1;

the control target is defined by a two-inertia system which includes the motor; and the motor is driven with a corrected input torque in accordance with the correction torque generated by the model following controller.

10. A drive device comprising:

the control device according to claim 9;

the motor; and a gear mechanism connected to the motor.

* * * * *